United States Patent
Baur et al.

(10) Patent No.: US 10,578,644 B2
(45) Date of Patent: Mar. 3, 2020

(54) PROBE SYSTEM AND METHOD FOR RECEIVING A PROBE OF A SCANNING PROBE MICROSCOPE

(71) Applicant: Carl Zeiss SMT GmbH, Oberkochen (DE)

(72) Inventors: Christof Baur, Darmstadt (DE); Sylvio Ruhm, Dresden (DE); Gabriel Baralia, Dieburg (DE); Christoph Pohl, Darmstadt (DE); Björn Harnath, Dresden (DE); Matthias Weber, Dresden (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 174 days.

(21) Appl. No.: 15/828,529

(22) Filed: Dec. 1, 2017

(65) Prior Publication Data

US 2018/0095108 A1   Apr. 5, 2018

Related U.S. Application Data

(63) Continuation of application No. PCT/EP2016/062436, filed on Jun. 2, 2016.

(30) Foreign Application Priority Data

Jun. 2, 2015 (DE) .................. 10 2015 210 159

(51) Int. Cl.
  *G01Q 70/00* (2010.01)
  *G01Q 70/02* (2010.01)
(52) U.S. Cl.
  CPC ............ *G01Q 70/00* (2013.01); *G01Q 70/02* (2013.01)

(58) Field of Classification Search
  USPC ...................... 850/40, 53; 73/105
  See application file for complete search history.

(56) References Cited

U.S. PATENT DOCUMENTS 5,423,514 A   6/1995   Wakiyama et al.
5,705,814 A   1/1998   Young et al.
(Continued)

FOREIGN PATENT DOCUMENTS

JP   H06-186027   7/1994   ............ G01B 21/30
JP   H06-281446   7/1994   ............ G01B 21/30
(Continued)

OTHER PUBLICATIONS

International Search Report for International Application No. PCT/EP2016/062436 dated Sep. 12, 2016.
(Continued)

*Primary Examiner* — Kiet T Nguyen
(74) *Attorney, Agent, or Firm* — Fish & Richardson P.C.

(57) ABSTRACT

The invention relates to a probe system for a scanning probe microscope which (a) has a receptacle apparatus for a probe, (b) has a probe storage, which provides at least one probe for the scanning probe microscope, (c) wherein the probe, the probe storage, and the receptacle apparatus are embodied in such a way that the probe can form a releasable first connection with the probe storage and a releasable second connection with the receptacle apparatus, wherein the first connection and/or the second connection use a magnetic force; and wherein the receptacle apparatus and the probe storage are movable relative to one another in such a way for receiving the probe that the probe forms the second connection before the first connection is released.

24 Claims, 17 Drawing Sheets

(56) References Cited

U.S. PATENT DOCUMENTS

| | | | |
|---|---|---|---|
| 5,756,887 A | 5/1998 | Bryson, III et al. | |
| 6,093,930 A | 7/2000 | Boyette, Jr. et al. | |
| 8,099,793 B2 | 1/2012 | Jo et al. | |
| 2007/0022804 A1 | 2/2007 | Kley | |
| 2013/0014296 A1 | 1/2013 | Humphris | |
| 2013/0111635 A1 | 5/2013 | Jeon | |
| 2016/0187376 A1* | 6/2016 | Humphris | G01Q 70/02 850/18 |

FOREIGN PATENT DOCUMENTS

| | | | | |
|---|---|---|---|---|
| WO | WO 02/080187 | 10/2002 | ............. | G12B 21/20 |
| WO | WO 2008/053217 | 5/2008 | ............. | G12B 21/22 |
| WO | WO 2015/019090 | 2/2015 | ............. | G01Q 30/20 |

OTHER PUBLICATIONS

German Office Action for German Application No. 10 2015 210 159.2 dated Mar. 17, 2016.
B. Goj et al.: "Electromagnetic changer for AFM-tips", Proceedings of the 23rd Micromechanics Europe Workshop, Ilmenau, Germany, 2012 (4 pages).
International Preliminary Report on Patentability and Written Opinion of the International Searching Authority for International Application No. PCT/EP2016/062436 dated Dec. 14, 2017 (15 pages).
Japanese Office Action for Japanese Application No. P2017-563108 dated Mar. 11, 2019.

* cited by examiner

PROBE SYSTEM AND METHOD FOR RECEIVING A PROBE OF A SCANNING PROBE MICROSCOPE

CROSS-REFERENCE TO RELATED APPLICATIONS

This application is a continuation of International Application PCT/EP2016/062436, having a filing date of Jun. 2, 2016, which claims priority to German patent application 10 2015 210 159.2, filed on Jun. 2, 2015. The entire contents of the above applications are hereby incorporated by reference.

TECHNICAL FIELD

The present invention relates to a probe system and a method for receiving a probe of a scanning probe microscope.

BACKGROUND

Scanning probe microscopes scan a specimen or its surface with a probe and thus produce a representation of properties of the specimen. Below, scanning probe microscopes are abbreviated SPM. Different SPM types are differentiated depending on the type of interaction between the measuring tip of a probe and the specimen surface. Use is often made of scanning tunneling microscopes (STMs), atomic force microscopes (AFMs) or scanning force microscopes (SFMs). In addition to these conventional SPM types, there are a multiplicity of further appliance types which are used for specific fields of application, such as e.g. magnetic force microscopes or optical and acoustic near-field scanning microscopes. Special scanning probe microscope probes which have also been designed for modifying a specimen in addition to analyzing the specimen surface have been developed.

Probes for the aforementioned scanning probe microscopes are often exposed to wear-and-tear, can become dirty or be damaged during operation. Thus, for example, tips for scanning tunneling microscopy or scanning force microscopy can become blunt or unusable in any other way. Therefore, it is useful to be able to replace probes quickly and without much outlay.

A probe interchange is difficult for, in particular, scanning probe microscopes that are used in vacuum surroundings if the system has to be aerated to this end. Therefore, the prior art has disclosed the use of probe arrays which have a multiplicity of probes. Examples thereof are described in the documents WO 02/080187 A1, WO 2008/053217 A1, US 2013/0014296 A1, and US 2013/0111635 A1. However, the production of probe arrays or probe arrangements is complicated. Moreover, their usage options can be restricted due to the spatial requirements of the probe arrays and/or their large mass.

In the article "Electromagnetic changer for AFM tips", the authors B. Goj, N. Vorbringer-Dorozhovets, C. Wystup, M. Hoffmann and E. Manske, in Proceedings of Micromechanics and Microsystems Europe Workshop 2012, ISBN: 978-3-938843-71-0 (https://www.tu-ilmenau.de/en/micromechanical-systems-group/publications/conferences), report about the design of an electromagnetic holding apparatus, with the aid of which a probe can be releasably fastened to the head of a scanning force microscope.

US 2007/0022804 A1 describes an apparatus which facilitates an automated interchange of the probe. The probes are held in a storage space by a spring, air, gravity, electromechanically or by vacuum-driven deposition mechanisms.

U.S. Pat. No. 5,705,814 describes a scanning probe microscope for an automated probe interchange. To this end, the SPM has a storage cassette for probes, in which a plurality of probes can be deposited. The probes are held in the storage cassette by vacuum-based, mechanical, electrostatic, magnetic or electromagnetic clamping. The free end of a scanner has a probe holder. The latter can hold a probe by use of negative pressure or mechanical, magnetic, electrostatic or electromagnetic clamping or by use of weak adhesives.

In the case of a magnetic holder of a probe, the contact between the probe and a permanent magnet is effectuated, as a rule, by use of a jerky movement of the probe which, depending on the strength of the magnet, can overcome a distance up to several millimeters. As a result, particles are often released, said particles possibly reaching a specimen to be examined and possibly causing a significant contamination problem. Moreover, this movement is uncontrolled and therefore leads to an at least partly unknown alignment of the probe relative to the probe holder. In order to avoid this problem, U.S. Pat. No. 5,705,814 proposes the use of an adjustable electromagnetic holder instead of a magnetic holder for the purposes of anchoring the probe to the probe holder.

U.S. Pat. No. 8,099,793 B2 describes an automated probe interchange system on the basis of permanent magnets. In order to establish a differential magnetic force between the probe holder of a scanning probe microscope and a probe holder of a probe repository, said magnetic force transferring a probe from the probe holder of the SPM to the probe holder of the probe repository, or vice versa, the permanent magnets of the probe repository are moved in the vertical direction. This is a disadvantage of the method described in the aforementioned patent document since, in addition to the movement of the probe repository, the permanent magnets thereof must also be moved relative to the probe repository by use of a complicated movement mechanism. Moreover, a complicated and accurate teach-in of the transfer position of the probe from the probe repository to the SPM, or vice versa, is required. If the transfer position is determined incorrectly, there is the risk of damage to the interchange mechanism or sensitive components of the complex AFM head.

The information provided above is merely to assist the reader in understanding the background of the invention. Some of the information provided in this "Background" section may not be prior art to the invention.

Therefore, the present invention is based on the problem of specifying a probe system and a method for receiving a probe of a scanning probe microscope which at least partly avoid the aforementioned disadvantages.

SUMMARY

According to an exemplary embodiment of the present invention, this problem is solved by a probe system for a scanning probe microscope, in which the probe system has: (a) a receptacle apparatus for a probe; (b) a probe storage, which provides at least one probe for the scanning probe microscope; (c) wherein the probe, the probe storage, and the receptacle apparatus are embodied in such a way that the probe can form a releasable first connection with the probe storage and a releasable second connection with the receptacle apparatus, wherein the first connection and/or the second connection use a magnetic force; and (d) wherein the receptacle apparatus and the probe storage are movable relative to one another in such a way for receiving the probe that the probe forms the second connection before the first connection is released.

A sensor system according to the invention ensures that, even under the action of a magnetic force, a probe always is connected either to the probe storage or to the receptacle apparatus. This is achieved by an intermittent overlap of the two connections. As a result, an uncontrolled movement of the probe, as may occur when a magnetic force is present, is avoided. As a consequence, contaminating particles are produced less, or not at all, when transferring a probe from the probe storage to the receptacle device. Moreover, the alignment of the probe is substantially maintained during a transfer process of the probe from the probe storage to the receptacle apparatus or in the reverse direction.

In a further aspect, the receptacle apparatus and the probe storage are movable relative to one another in such a way for depositing the probe that the probe forms the first connection before the second connection is released.

Receiving a probe from the probe storage and depositing the probe in the probe storage are substantially symmetrical processes in this exemplary embodiment for the above-described probe system. The aforementioned advantages of a probe system according to the invention consequently also are obtained when depositing the probe in the probe storage.

According to a further aspect, the probe storage and/or the receptacle apparatus and/or the probe have at least one permanent magnet.

One or more permanent magnets are used to produce an inhomogeneous magnetic flux density distribution. Permanent magnets can be produced in very many embodiments. Further, the flux density distribution thereof is adjustable. In one exemplary embodiment, neither the probe storage nor the receptacle apparatus have active mechanical (i.e. movable) components. Therefore, the apparatus can be produced in a cost-effective manner and the operation thereof is simple.

In a preferred aspect, the probe storage and/or the receptacle apparatus and/or the probe have at least one soft ferromagnetic material.

A soft ferromagnetic material is drawn in the direction of increasing flux density, i.e. in the direction of one of the poles of a magnet, by an inhomogeneous flux density distribution. Hence, an inhomogeneous magnetic flux density distribution exerts a force, i.e. the aforementioned force, on a soft ferromagnetic material.

Soft ferromagnetic material can be optimized for the respective intended use. In an above-defined probe system, one or more permanent magnets can be designed together with the soft ferromagnetic material in a common optimization process for purposes of the demanded holding functions.

The use of a permanent magnet in combination with a soft ferromagnetic material for holding the probe in the probe storage and/or on the receptacle apparatus further is advantageous in that there is no need for feed lines for producing the holding force.

In a further aspect, the probe system further has at least one electrical coil which is arranged in such a way that it can influence the releasable first connection and/or the releasable second connection.

The use of an electrical coil allows the magnetic force to be adjusted by varying a coil current. As a result, there can be a soft design of the formation of a connection between the probe and the receptacle apparatus and of the release of this connection. This may also apply to the releasable connection between the probe storage and the probe. Moreover, a transfer process of the probe from the probe storage or to the probe storage can be carried out in a regulated manner by adjusting the coil current. The energy consumption in the coil remains low if a current through the coil is only required during a probe interchange process, as a result of which strong heating of the vacuum surroundings is prevented.

In another aspect, the at least one permanent magnet has a maximum magnetic flux density in the range of 0.01 tesla-2.0 tesla, preferably 0.05 tesla-1.0 tesla, more preferably 0.1 tesla-0.5 tesla, and most preferably 0.2 tesla-0.4 tesla.

According to an expedient aspect, the receptacle apparatus has at least one first permanent magnet, the probe storage has at least one second permanent magnet and the probe comprises at least one soft ferromagnetic material.

A probe storage which holds the probes stored therein by a magnetic force reliably prevents a displacement or slippage of the stored probes when the probe storage is transported. As a consequence, no particles, or only small amounts of particles, are generated during the transport of the probe storage. Moreover, the risk of damaging the stored probes is thus avoided.

In another preferred aspect, the probe system further has at least one magnetic field sensor for determining a position of the receptacle apparatus relative to the probe and/or the probe storage.

The magnetic flux density distribution produced by one or more permanent magnets can be measured by use of a magnetic field sensor. A magnetic field sensor can then be used to determine a change in the distance between the receptacle apparatus and probe storage from a change in the magnetic flux density distribution, or at least to assist the determination of a change in the distance.

In a further expedient aspect, a first electrical measurement system is embodied to determine whether the probe has formed the first connection to the probe storage. According to another preferred aspect, a second electrical measurement system is embodied to determine whether the probe has formed the second connection to the receptacle apparatus.

One or more electrical measurement systems open up an additional option for determining whether one or both of the releasable connections have been formed or released. These data can be used to regulate a probe transfer process. Further, they allow the detection of a fault during a probe receiving process or a probe depositing process.

In another preferred aspect, the receptacle apparatus is attached to a measuring head of the scanning probe microscope.

Hence, the measuring head of the scanning probe microscope can directly receive a probe from the probe storage, carry out examinations on a specimen and/or process a specimen, and subsequently re-deposit the probe in the probe storage. However, a receptacle apparatus can also be attached to a transport apparatus which transports a probe from a distant probe cartridge into a probe storage in the vicinity of the measuring head of the scanning probe microscope or which transports a defective probe from the probe cartridge or from the probe storage to another location, for example a refuse container. Further, it is conceivable that a transport apparatus having a receptacle apparatus channels a probe through an airlock into the vacuum surroundings of a scanning probe microscope.

In another aspect, the probe comprises: at least one measuring tip, at least one cantilever, and at least one fastening area for the first connection and/or the second connection.

According to an expedient effect, the probe storage comprises at least one angled holder for the probe, wherein at least one portion of the angled holder is embodied to form the first connection. According to a further aspect, the probe storage comprises at least two angled holders for forming the first connection to the probe. According to another aspect, the two angled holders are arranged in such a way that the angled parts of the holders point toward one another. In another aspect, the distance between the two angled holders is less than a dimension of the fastening area of the probe. According to a preferred aspect, the distance between the two angled holders is greater than a dimension of a fastening area of the receptacle apparatus such that the receptacle apparatus can be moved between the two angled holders. In an expedient aspect, the at least two angled holders are arranged in such a way that the probe can be moved by the receptacle apparatus in a direction away from the two angled holders.

According to another advantageous aspect, the angled part of the at least one angled holder has at least one permanent magnet. Preferably, the permanent magnet is housed in an end region of the angled part of the angled holder.

According to another aspect, the probe system further has a specimen stage on which the probe storage is arranged, wherein the specimen stage comprises at least one displacement unit which is embodied to displace the specimen stage in at least a specimen stage plane.

According to a further exemplary embodiment of the present invention, the problem is solved by a method for receiving a probe of a scanning probe microscope by use of a probe system. In an embodiment, the method includes the sequence of the following steps: (a) providing a first releasable connection between a probe and a probe storage; (b) providing a second releasable connection between the probe and a receptacle apparatus; and (c) releasing the first connection together with a movement of the receptacle apparatus relative to the probe storage, wherein the first connection and/or the second connection comprises a magnetic force.

According to a further aspect, the method is carried out using a probe system as described above.

DESCRIPTION OF DRAWINGS

The following detailed description describes currently preferred exemplary embodiments of the invention, with reference being made to the drawings, in which.

DETAILED DESCRIPTION

Currently preferred embodiments of a probe system according to the invention and of a method according to the invention are explained in more detail below in conjunction with a scanning probe microscope. It is self-evident that the probe system defined in the claims and the method defined in the claims are not restricted to the exemplary embodiments indicated below. Rather, these can be used in general for probe microscopes which have interchangeable probes. Moreover, it is possible to use the described method to avoid an uncontrolled movement, caused by a magnetic force, of an object which has a soft magnetic material or a further permanent magnet.

Figure 1:
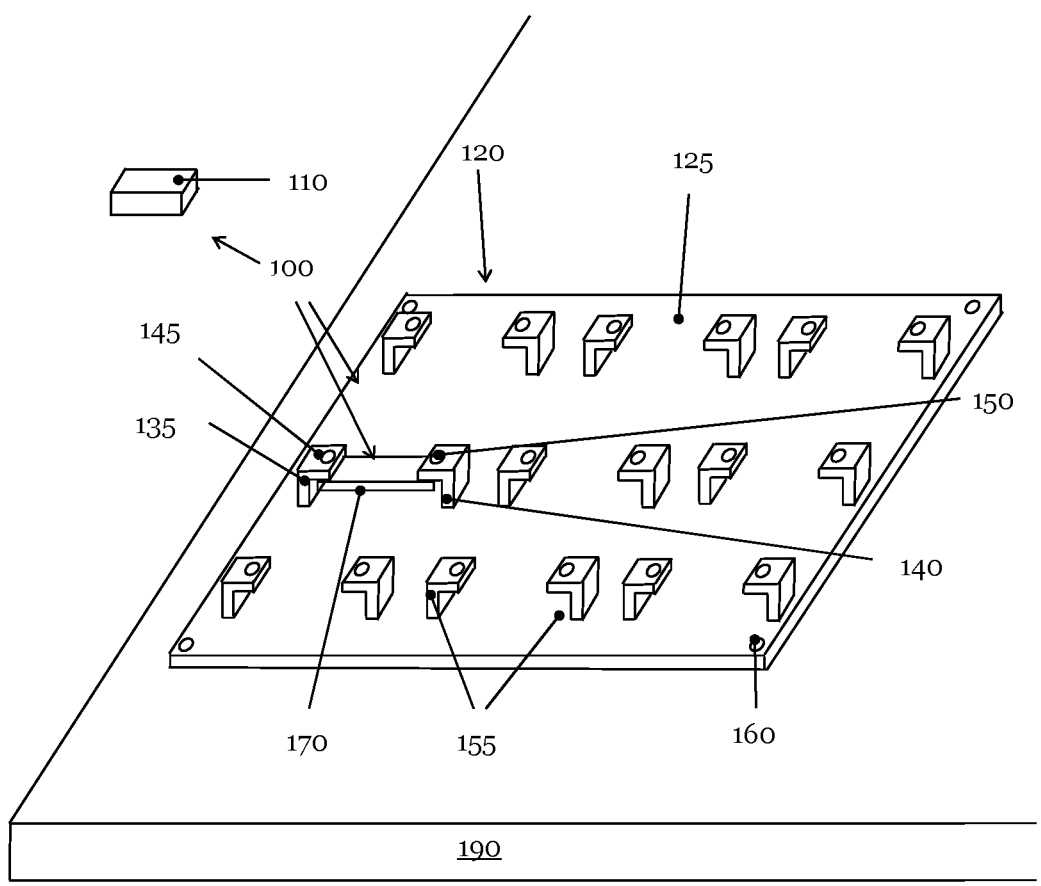
FIG. 1 shows a schematic illustration of some important components of a probe system.

FIG. 1 schematically shows some important components of a probe system 100 or of a probe interchange system. The probe system 100 comprises a receptacle apparatus 110. Possible embodiments of a receptacle apparatus 110 are discussed below with reference to FIGS. 10, 11, and 21. Further, the probe system 100 contains a probe storage 120. In the example indicated in FIG. 1, the probe storage 120 comprises a substrate 125 or a base plate 125, on which nine holders 135, 140, angled in pairs, are attached for receiving a probe 170 from the receptacle apparatus 110 and/or for depositing a probe 170 to the receptacle apparatus 110. A receptacle possibility for a probe 170 is also referred to as receptacle 155 below. In the example indicated in FIG. 1, the probe 170 has a soft ferromagnetic material. Exemplary embodiments of a probe 170 are explained below in the context of FIGS. 14, 16, and 22.

The material of a probe storage 120 can be selected as desired. However, care has to be taken that the material of the base plate 125 and of the angled holders 135, 140 contains substantially no hard ferromagnetic material. Here, and at other places in this description, the expression "substantially" denotes the indication of a variable within the error limits when using measurement appliances according to the prior art.

It is still possible to use the probe system 100 if the base plate 125 and the angled holders 135, 140 of the probe storage 120 nevertheless have a significant proportion of hard ferromagnetic material, but its use may be made more difficult as a result thereof.

The form, dimension and number of the receptacles 155 for probes 170 of a probe storage 120 can be adapted to the use of the respective scanning probe microscope. The number of receptacles 155 of a probe storage 120 may comprise the range from one to several ten probes 170. The form of the probe storage 120 can be adapted to the conditions in a scanning probe microscope, for example to the form and dimensions of a specimen stage 190. Care in respect of the dimensions of the probe storage 120 when using the probe system 100 in scanning probe microscopes operating in vacuum surroundings only has to be taken to the extent that the probe storage 120 can be channeled into the interior of the SPM without problems. By way of example, the probe storage 120 can be channeled into vacuum surroundings of a scanning probe microscope in an automated manner by use of a transport system (shown in FIG. 1).

In the example of FIG. 1, the base plate 125 of the probe storage 120 has fastening options 160 in the form of four holes. The specimen stage has projections or spikes (not illustrated in FIG. 1), with the aid of which the probe storage 120 can be anchored to the specimen stage 190. Other fastening options are possible (not illustrated in FIG. 1). The specimen stage 190 may be movable (not shown in FIG. 1) in one direction (e.g. in the z-direction, i.e. perpendicular to the plane of the specimen stage 190), in two directions (e.g. in the x-direction and y-direction, i.e. in the plane of the specimen stage 190) or in three directions, for example by way of one or more displacement units, for example in the form of micro displacement elements. Currently, it is preferable to embody the specimen stage 190 to be displaceable in the plane of the specimen stage 190.

Figure 2:
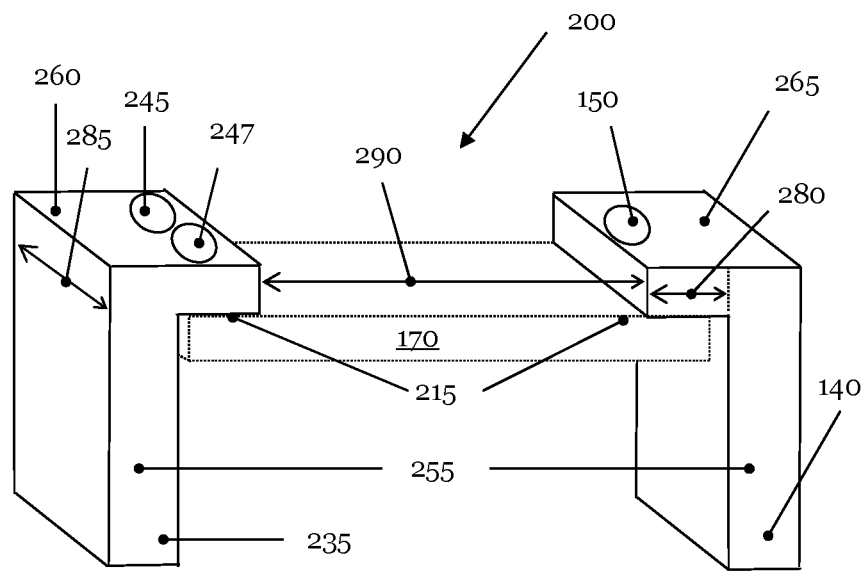
FIG. 2 illustrates a schematic magnified illustration of a probe storage receptacle which is formed by two angled holders.

In the probe storage 120 illustrated in FIG. 1, each of the holders 135, 140, angled in pairs, has a permanent magnet 145, 150. Neither the angled holders 135, 140, or receptacle 155, nor the arrangement of the permanent magnets 145, 150 is restricted to the example illustrated in FIG. 1. FIG. 2 shows a receptacle 255, in which the angled holder 235 has two permanent magnets 245 and 247 and the angled holder 140 is equipped with one permanent magnet 150 for the purposes of holding a probe 170.

The permanent magnets 145, 150, 245 and 247 preferably have a disk-shaped form and preferably produce an axially symmetric distribution of the magnetic flux density. However, it is also possible to use permanent magnets which have a different form, for example the form of a rectangle or a square. Further, the magnetic flux density distribution of the permanent magnets can be selected or adjusted in such a way that an alignment of the probe 170 is simplified by way of a self-adjustment. Moreover, it is also possible to use permanent magnets whose magnetic flux density distribution is not axially symmetric. However, this may make positioning of a probe 170 relative to the receptacle 255 more difficult.

It is expedient if the axis of the magnetic flux density distribution substantially corresponds to the axis of the disk-shaped permanent magnet 145, 150, 245, and 247. The disk-shaped permanent magnets 145, 150, 245, and 247 are preferably installed into the angled parts 260 and 265 of the angled holders 135 and 140, to be precise in such a way that the axis of the magnetic flux density distribution is substantially perpendicular to the surface of the angled parts 260 and 265, and hence also perpendicular to the base plate 125 of the probe storage 120. As a result, the force produced by the permanent magnets 145, 150, 235, and 237, i.e. the aforementioned magnetic force, is maximized. For the receptacle 155, it is advantageous if the north pole in one of the two permanent magnets 145, 150 points in the direction of the base plate 125 of the probe storage 120 and if the other permanent magnet points in this direction with its south pole. It is expedient for the angled holder 235 if the poles of the permanent magnets 245 and 247 stand in anti-parallel fashion. As a result of this arrangement, stray fields of the permanent magnets 145, 150, 245, 247 are minimized.

The strength of the permanent magnets 145, 150, 245, and 247 is designed taking into account the soft ferromagnetic material and the mass of the probe 170 such that the magnetic force caused by the permanent magnet or magnets 145, 150, 245, and 247 securely holds the probe 170 in the receptacle 255 of the probe storage 120. To this end, for example, the permanent magnet or magnets 145, 150, 245, and 247 is/are designed in such a way that the magnetic force exerted on the probe 170 exceeds the gravitational force by a safety factor, for example by a factor of 2. On the other hand, it is expedient to design the magnetic force of the permanent magnets 145, 150, 245, and 247 not to be unnecessarily large as this makes the reception of the probe 170 by the receptacle apparatus 110 more difficult than necessary.

The diameter of the disk-shaped permanent magnets 145, 150, 245, and 247 ranges from the sub-millimeter region into the region of a few millimeters. The height of the permanent magnets 145, 150, 245, and 247 comprises the same range. In principle, all hard ferromagnetic materials can be used as a material for the permanent magnets 145, 150, 245, and 247. Current examples of conventional materials for producing permanent magnets include alloys of iron, boron and neodymium. The permanent magnets 145, 150, 245, and 247 are attached to the angled parts 260, 265 of the angled holders 135, 140, 235. Preferably, the permanent magnets 145, 150, 245, and 247 are fitted in perpendicular fashion into the angled parts 260, 265 in such a way that they are as far away as possible from the perpendicular parts of the angled holders 135, 140, 235. By way of example, fitting can be effectuated by pressing or adhesive bonding.

In the examples illustrated in FIGS. 1 and 2, the probe 170 has a rectangular form. However, the probe 170 may have any form. The distance between the angled holders 135, 140, 235 is adapted to the dimensions of the probe 170. Here, the distance between the angled holders 135, 140, 235 is selected in such a way that the probe 170 maintains a predetermined distance from both angled holders 135, 140, said distance serving as a play for receiving the probe 170 from the receptacle 255 and for the dispensing into the receptacle 255 of the probe storage 120. The clear space between the base plate 125 of the probe storage 120 and the lower sides of the angled parts 260, 265 of the angled holder 135, 140, 235 is geared to the thickness of the probe 170. Moreover, when designing the height of the angled holder 135, 140, 235, care is taken that the probe 170 can be comfortably moved through under the angled parts 260, 265 without the lower side of the probe 170 contacting the base plate 125 of the probe storage 120. The width 285 of the angled holders 135, 140, 235 is geared to the mass of the probe 170.

The length 280 of the angled parts 260, 265 of the angled holders 135, 140, 235 is dimensioned in such a way that, firstly, the probe 170 can form a reliable releasable connection 215 to the angled holders 135, 140, 235 and that, secondly, the receptacle apparatus 110 can be guided through the opening 290 at a predetermined safety distance.

In the diagram 200 of FIG. 2, the first magnetic connection 215, caused by the magnetic force, between the angled holders 235, 140 and the probe 170 produces direct mechanical contact between these elements. The probe 170 typically has a metallic conductivity. If the two angled holders 235 and 140 are formed from a metal, the presence or formation of the first magnetic connection 215 can be determined by an electrical measurement system.

Figure 3:
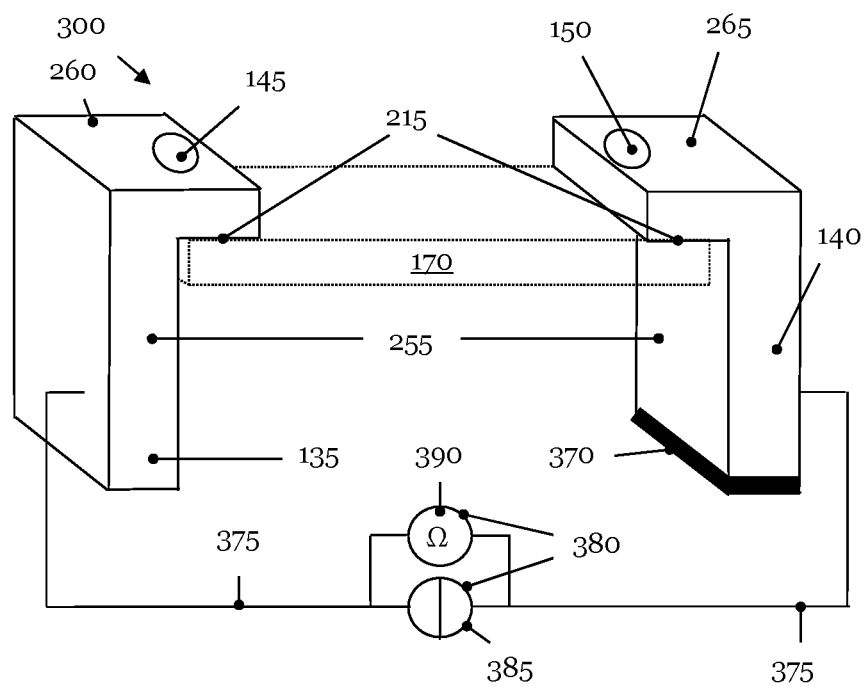
FIG. 3 reproduces the receptacle of FIG. 2, in which both angled holders have a permanent magnet and an electrical measurement system detects the formation and release of a connection between a probe and the angled holder, FIG. 4 reproduces the receptacle of FIG. 2, in which both angled holders have a permanent magnet and a plastic film is arranged between the probe and the angled holders.

This is illustrated schematically in the diagram 300 of FIG. 3. FIG. 3 once again shows the holder 255 illustrated in FIG. 2, with the difference that the angled holder 135 only contains one permanent magnet 145. The angled holder 140 is insulated from the base plate 125 of the probe storage 120 (not shown in FIG. 3) by an electrical insulation layer 370. It is possible to dispense with the electrical insulation layer 370 if the base plate 125 consists of a material with only very poor electrical conductivity. In the example of FIG. 3, the electrical measurement system 380 comprises a power source 385 and a resistance measuring appliance 390 which is connected in parallel with the power source 385. By way of example, the electrical measurement system 380 can be embodied in the form of a digital multimeter. Electrical feed lines 375 connect the angled holders 135, 140 to the electrical measurement system 380. When the magnetic connection 215 is formed or released, which is accompanied by the formation or release of a metallic contact in the example of FIG. 3, there is a change in the display of the resistance measuring appliance 390 of the electrical measurement system 380. In the present application, the formation of a magnetic connection means that mechanical resistance prevents a further approach of a probe to a permanent magnet or a further approach of a permanent magnet to a soft ferromagnetic material. That is to say, a magnetic connection is present if a mechanical force prevents a movement of the probe by way of a magnetic flux density distribution.

Figure 4:
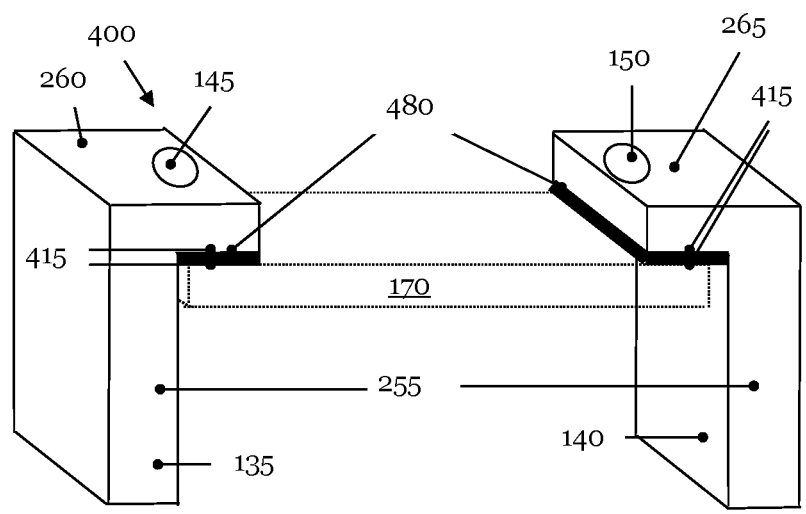

The diagram 400 of FIG. 4 elucidates that the formation of a magnetic connection does not require direct mechanical contact between the probe 170 and the angled parts 260 and 265 of the angled holders 135 and 140. A plastic film 480, preferably a polyimide film, is attached to the lower sides of the angled parts 260, 265. By way of example, the plastic film 480 can be fastened by way of adhesive bonding to the angled parts 260, 265. The plastic film 480 dampens the formation and release of the releasable magnetic connection 415. Preferably, the thickness of the plastic film lies in the range from one micrometer to several hundred micrometers. It is expedient to consider the plastic film 480 or the thickness thereof when designing the permanent magnets 145 and 150. In this example, the releasable magnetic connection 415 extends through the plastic film 480 from the lower sides of the angled parts 260, 265 of the angled holders 135, 140 to the probe 170.

In the example illustrated in FIG. 4, the plastic film 480 is attached to the lower sides of the angled parts 260, 265, substantially over the whole area thereof. It is also possible to apply a plastic film 480 to only a part of the lower side of the angled parts 260, 265. This is expedient, in particular, if the parts of the lower sides of the angled parts 260, 265 that remain clear are required to establish an electrical contact between the probe 170 and the angled holders 135 and 140 (not illustrated in FIG. 4). By way of example, an electrical connection can be imparted by way of a contact spring. Typically, the latter is attached to each one of the angled holders 135 and 140. However, it is also possible to attach the contact springs to the probe 170.

Figure 5:
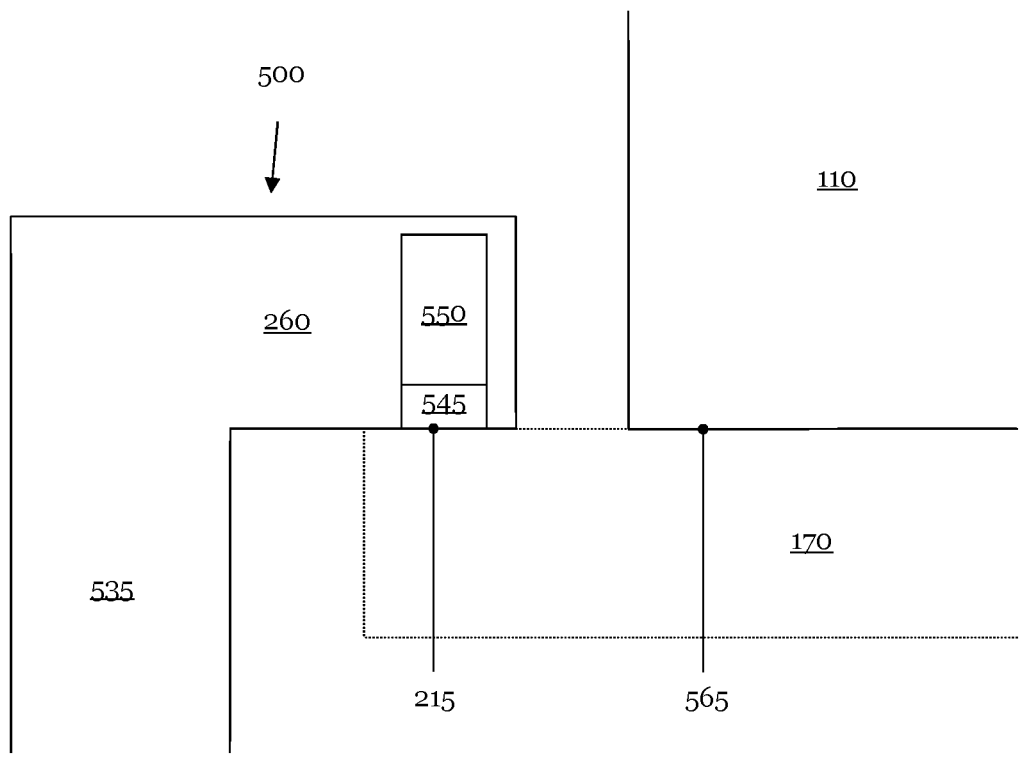
FIG. 5 shows a schematic section through an angled holder which contains a combination of a permanent magnet and a coil.

The diagram 500 in FIG. 5 represents a section through an angled holder 535, the angled part 260 of which contains the combination of a permanent magnet 545 and an electrical coil 550. The permanent magnet 545 can be one of the permanent magnets 145, 150, 245, and 247. An electrical coil 550 is arranged above the permanent magnet 545. The configuration illustrated in FIG. 5, in which the axes of the coil 550 and of the permanent magnet 545 are flush, is preferred since this allows the greatest possible influence on the magnetic flux density distribution of the permanent magnet 545 by varying the current through the coil 550. The electrical supply lines for the coil 550 are suppressed in FIG. 5.

The magnetic force acting on a probe 170 can be increased or decreased by the direction of the current through the coil 550. In combination with the magnetic flux density distribution of the coil 550, the magnetic force of the permanent magnet 545 produces a first releasable magnetic connection 215 between the angled holder 535 and the probe 170. In principle, the sequence of a coil 550 and permanent magnet 545 can be reversed. As a result, the influencing effect of the coil 550 on the magnetic flux density distribution arising from the combination of coil 550 and permanent magnet 545 and, hence, the magnetic force acting on the first releasable magnetic connection 215 can be maximized. However, if the permanent magnet 545 should hold the probe 170 on its own, a significantly stronger permanent magnet 545 must be used in this case in order to compensate the large distance between the permanent magnet 545 and the first magnetic connection 215.

FIG. 5 schematically shows part of the receptacle apparatus 110 which has formed a second releasable magnetic connection 565 with the probe 170. In order to simplify the release of the first magnetic connection 215, it may be expedient to reduce, with the aid of the coil 550 and in a defined manner, the magnetic force produced by the combination of permanent magnet 545 and coil 550. As a result, the first magnetic connection can be released with little force outlay.

Figure 6:
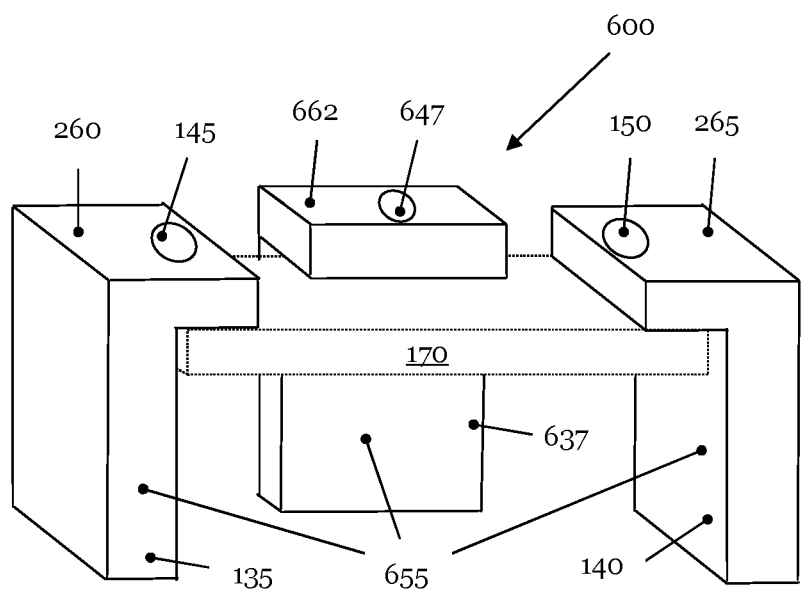
FIG. 6 elucidates a schematic magnified illustration of a receptacle which is formed by three angled holders.

In FIGS. 1 to 4, two angled holders 135, 140, and 235, the angled parts 260 and 265 of which point toward one another, form the holder 155 and 255 for a probe 170 in each case. FIG. 6 shows an embodiment of a probe storage 120 in which three angled holders 135, 140, and 637 form a receptacle 655. The receptacle 655 distributes the magnetic force more uniformly over the surface of the probe 170. Further, the receptacle 655 allows the realization of a stop for the probe 170 (not shown in FIG. 5). Secondly, the receptacle 655 restricts the movement of the probe 170 relative to the receptacle 655 in comparison with the receptacles 155 and 255.

Figure 7:
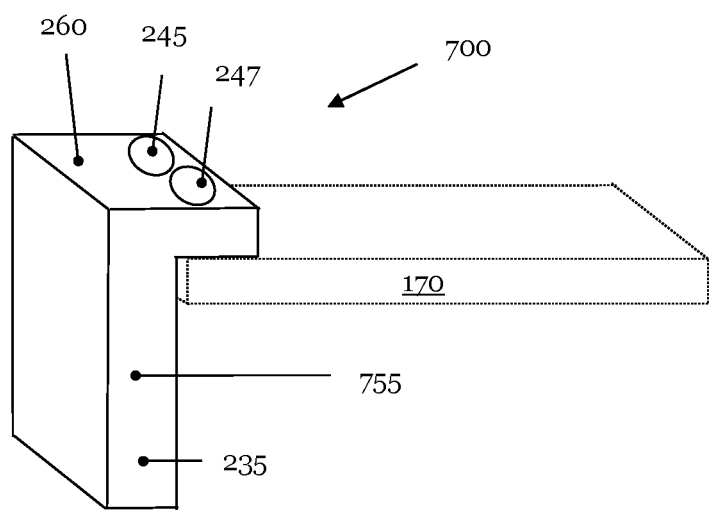
FIG. 7 indicates a schematic magnified illustration of a receptacle which only has one angled holder.

The diagram 700 of FIG. 7 represents a receptacle 755 of a probe storage 120 which has only one angled holder 235. In the example of FIG. 7, the angled part 260 of the angled holder 235 has two permanent magnets 245 and 247. However, the angled holder 235 can also be embodied with only one permanent magnet 145 or with more than two permanent magnets. The receptacle 755 minimizes the outlay when producing a probe storage 120. At the same time, the receptacle 755 optimizes the movement options of the probe 170 relative to the angled holder 235. On the other hand, the stability of the holder of the probe 170 in the receptacle 755 is reduced in comparison with the receptacles 155, 255, and 655.

A multiplicity of further receptacles for a probe storage 120 is producible in addition to the receptacles 155, 255, 655, and 755, illustrated in FIGS. 1 to 4 and 6, and 7, for a probe 170. In particular, it is possible to vary the form of the angled holder 135, 140, 235 and the number of employed permanent magnets 145, 150, 245, and 247. Two exemplary embodiments in which the receptacles of a probe storage 120 form a releasable connection to a probe without the involvement of a magnetic force are indicated below.

Figure 8:
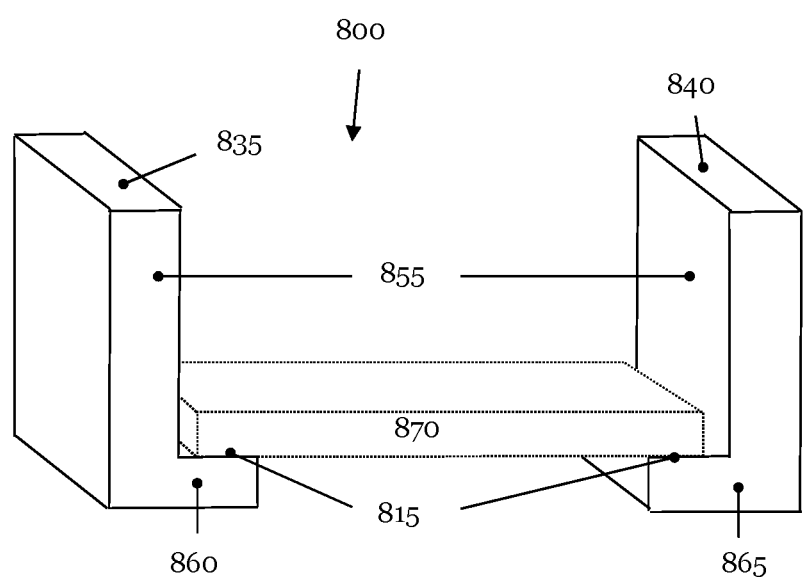
FIG. 8 elucidates a schematic illustration of a receptacle in which a probe forms a first releasable connection under the action of gravity.

The diagram 800 of FIG. 8 shows a receptacle 855 with two angled holders 835, 840, which are attached to a lower side of the base plate 125 of a probe storage 120 (not illustrated in FIG. 8). The probe 870 rests on the two angled parts 860, 865. Gravity establishes a releasable connection 815 between the angled holders 835 and 840 and the probe 870. In order to interchange the probe 870, the receptacle apparatus 110 approaches the probe 870 from below in the example of FIG. 8 (not indicated in FIG. 8).

Figure 9:
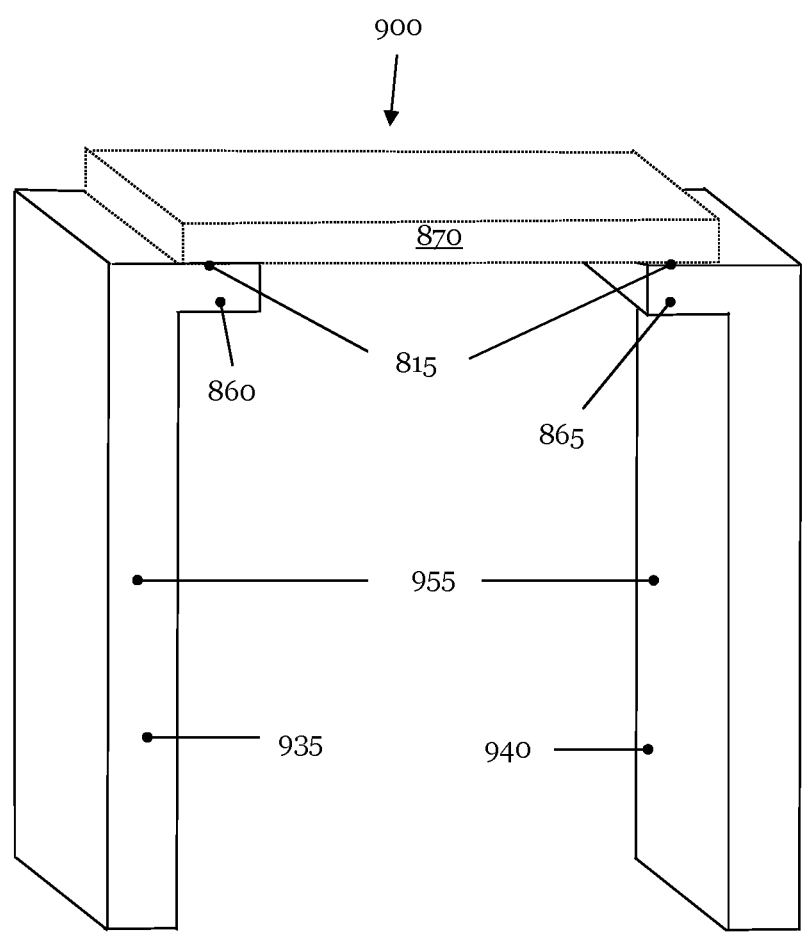
FIG. 9 schematically indicates a second embodiment of a receptacle in which a probe is held by the action of gravity.

In the diagram 900 reproduced in FIG. 9, the angled holders 935, 940 are attached to the upper side of the base plate 125 of a probe storage 120, like in FIGS. 1 to 7. The height of the two angled holders 935 and 940 is selected to be so great that the receptacle apparatus 110 of the probe 870 can approach from below without contacting the base plate 125 of the probe storage 120 (not illustrated in FIG. 8) or the probe 870. Held by gravity, the probe 870 rests on the angled parts 860, 865 of the holder 955. Like in FIG. 8, the releasable connection 815 between the angled holders 935, 940 and the probe 870 is formed without the action of a magnetic force.

The electrical measurement system described in FIG. 3 can also be used to detect the releasable connection 815 of the exemplary embodiments illustrated in FIGS. 8 and 9. Further, the plastic film 480, which was explained with respect to FIG. 4, may be arranged between the probe 870 and the angled parts 860, 865 of the receptacles 855, 955. Moreover, by way of the modifications described in FIGS. 8 and 9, the receptacle 655 presented in FIG. 6 likewise can form a releasable connection to a probe 870 without the action of a magnetic force. It is expedient to secure the probes 870 against slippage for the purposes of transporting a probe storage 120 according to the configurations discussed in FIGS. 8 and 9. By way of example, this can be effectuated by mechanical clamping (not shown in FIGS. 8 and 9).

Figure 10:
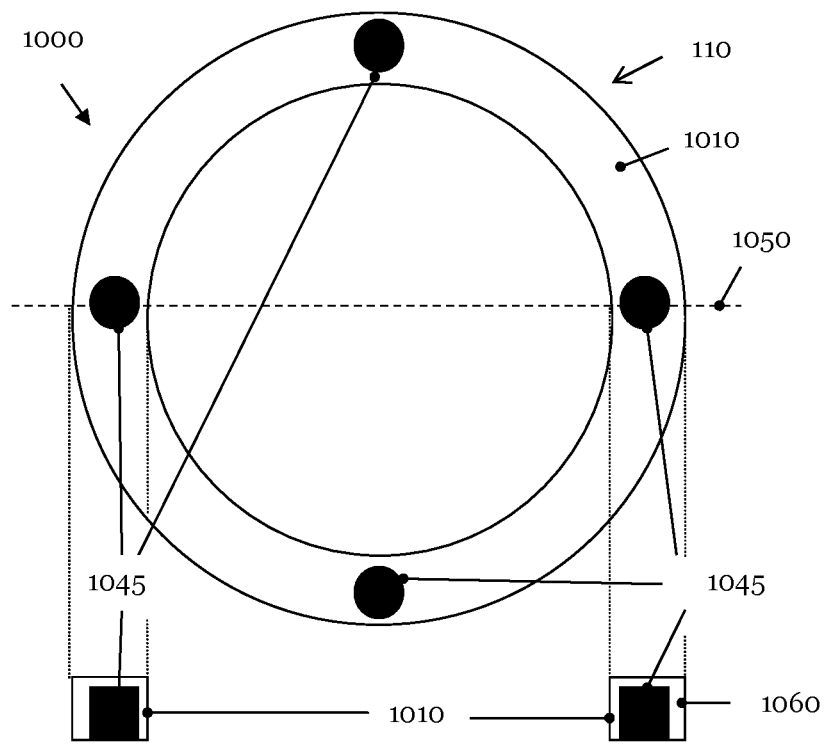
FIG. 10 represents a schematic illustration of a receptacle apparatus.

The diagram 1000 in FIG. 10 illustrates an exemplary embodiment of the receptacle apparatus 110. The upper part of FIG. 10 represents a view from below and the lower part shows a section through the receptacle apparatus 110 along the line 1050. In the example elucidated in FIG. 10, the receptacle apparatus 110 has the form of a ring 1010 with a rectangular cross-section 1060. Four permanent magnets 1045 are inserted into the ring 1010 with an equidistant spacing. The permanent magnets 1045 have the form of a disk and the axis of their magnetic flux density distribution is substantially perpendicular to the disk plane. The permanent magnets 1045 can be fastened in the ring 1010 of the receptacle apparatus 110 by pressing or adhesive bonding. In order to minimize the stray fields, it is expedient if the alignment of the north poles and south poles of the permanent magnets 1045 alternate along the ring 1010.

As elucidated in the lower part of FIG. 10, it is expedient if the lower side of the permanent magnets 1045 is aligned in a substantially planar manner in relation to the lower side of the ring 1010 of the receptacle apparatus. As a result, the permanent magnets 1045 produce a maximum magnetic force on a probe 170 while, at the same time, guiding the probe 170 to the best possible extent by way of the ring 1010 of the receptacle apparatus 110. The number of permanent magnets 1045 in a receptacle apparatus 110 is not restricted to four. At least two permanent magnets 1045 should be used for the purposes of the good guidance of a probe 170 by way of the receptacle apparatus 110. The outlay and the costs for producing the receptacle apparatus 110 increase with an increasing number of permanent magnets. On the other hand, a more uniform distribution of the magnetic force over the area of the ring 1010 is obtained by a greater number of permanent magnets 1045.

In the exemplary embodiment of FIG. 10, the receptacle apparatus 110 has the form of a ring 1010. However, the form of a receptacle apparatus is not restricted to the ring form 1010 indicated in FIG. 10. Rather, the receptacle apparatus 110 can have the form of a disk or, for example, of a rectangle (not illustrated in FIG. 10).

Both the requirements on a permanent magnet 145, 150, 245, and 247 and various modifications for forming a first magnetic connection 215, 415 were explained in detail in the context of FIGS. 1 to 5. The embodiments described above likewise can be used for producing a receptacle apparatus 110.

Figure 11:
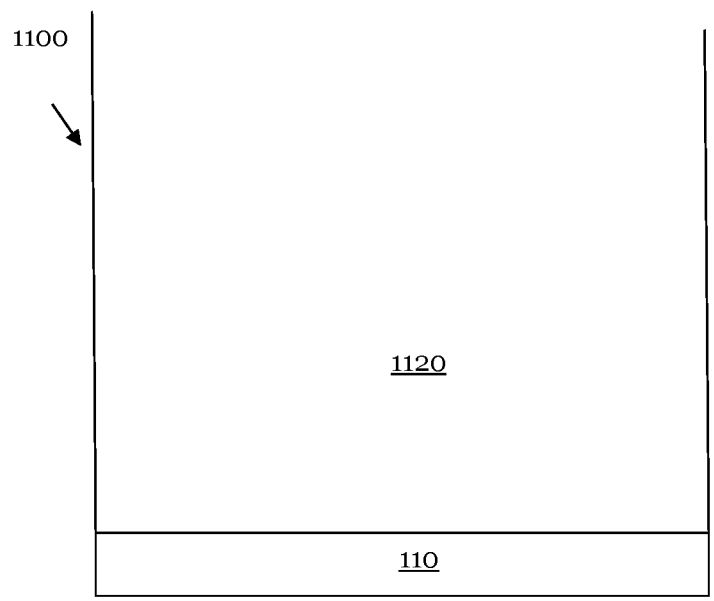
FIG. 11 shows a schematic section through a receptacle unit which is attached to a measuring head of a scanning probe microscope.

The diagram 1100 of FIG. 11 schematically shows a section through a receptacle apparatus 110, which has the ring form 1010 illustrated in FIG. 10 and which is attached to a measuring head 1120 of a scanning probe microscope. By way of example, a connection between the measuring head 1120 and the receptacle apparatus 110 can be established by screwing or adhesive bonding. By attaching the receptacle apparatus 110 to the measuring head 1120 of an SPM, the receptacle apparatus 110 obtains the movement options of the measuring head 1120. Typically, a measuring head 1120 of an SPM can be moved in the plane of the specimen stage 190 (slow and fast scanning directions or in the xy-plane) and perpendicular to the plane of the specimen stage 190, i.e. in the z-direction.

In the example illustrated in FIG. 11, the measuring head 1120 of the SPM and the receptacle apparatus 110 are flush in the vertical direction. This is not necessary. All that needs to be ensured is that the receptacle apparatus 110 and possibly the lower part of the measuring head 1120 fit between the angled holders 130, 140, 235, which have the spacing 290.

The receptacle apparatus 110 need not necessarily be attached to a measuring head 1120 of an SPM. By way of example, the receptacle apparatus 110 also can be fastened to a transport apparatus for probes 170 (not illustrated in FIG. 11).

Figure 12:
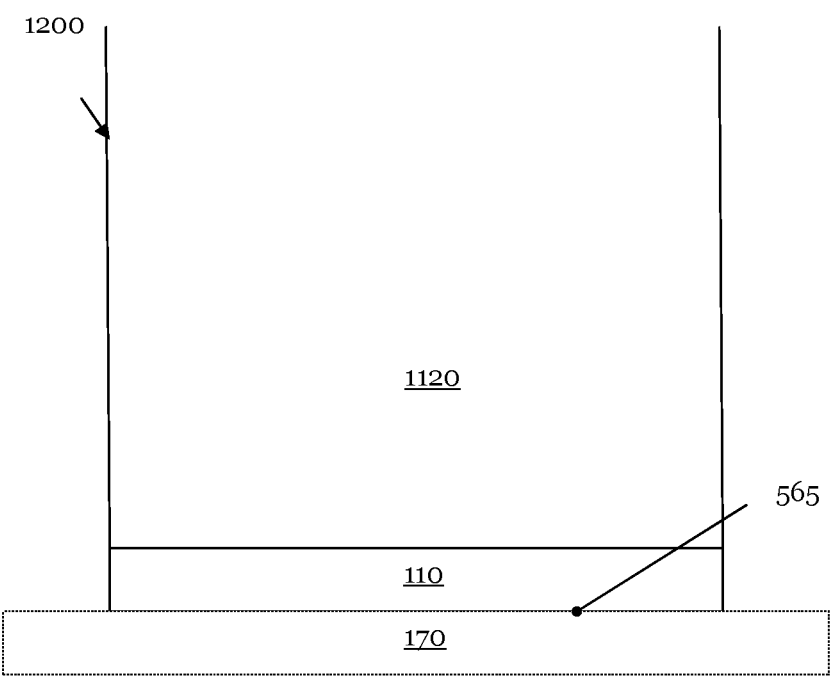
FIG. 12 reproduces FIG. 11, wherein the receptacle apparatus has formed a releasable magnetic connection to a probe.

The diagram 1200 of FIG. 12 elucidates the combination of the measuring head 1120 and the receptacle apparatus 110 of FIG. 11, wherein the receptacle apparatus 110 anchors a probe 170 by use of a magnetic connection 565. As described above, the probe 170 has a soft ferromagnetic material such that the magnetic force produced by the permanent magnets 1045 holds the probe 170 against the receptacle apparatus 110. That is to say, the probe 170 has formed a releasable magnetic connection 565 with the receptacle apparatus 110 by way of the magnetic force of the permanent magnets 1045.

Figure 13:
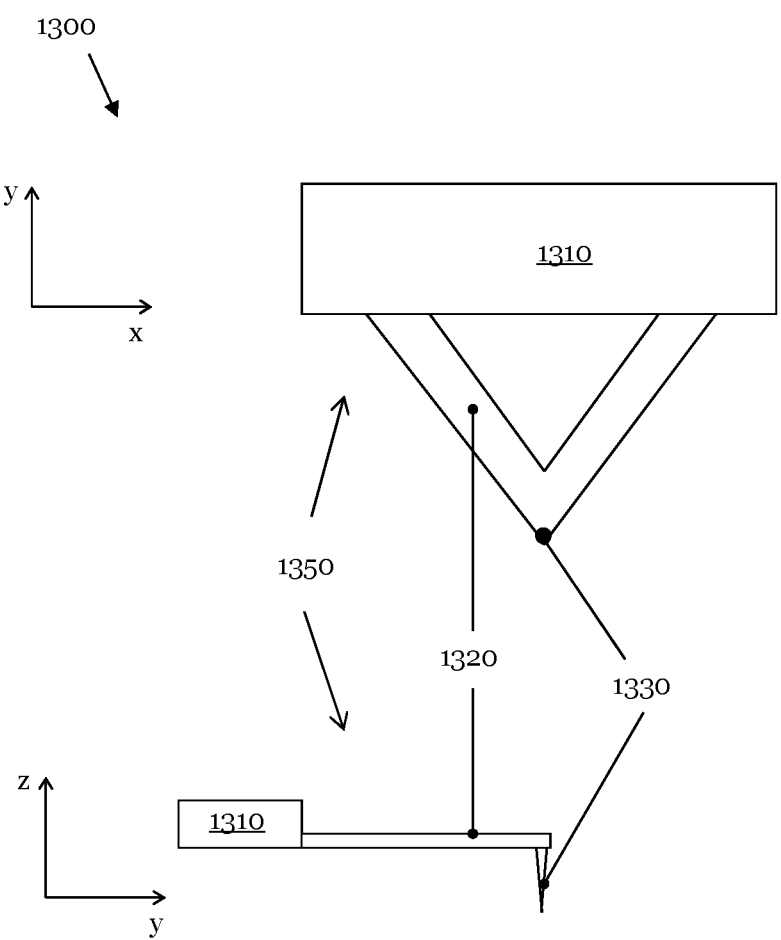
FIG. 13 represents a schematic illustration of a measuring probe.
Figure 14:
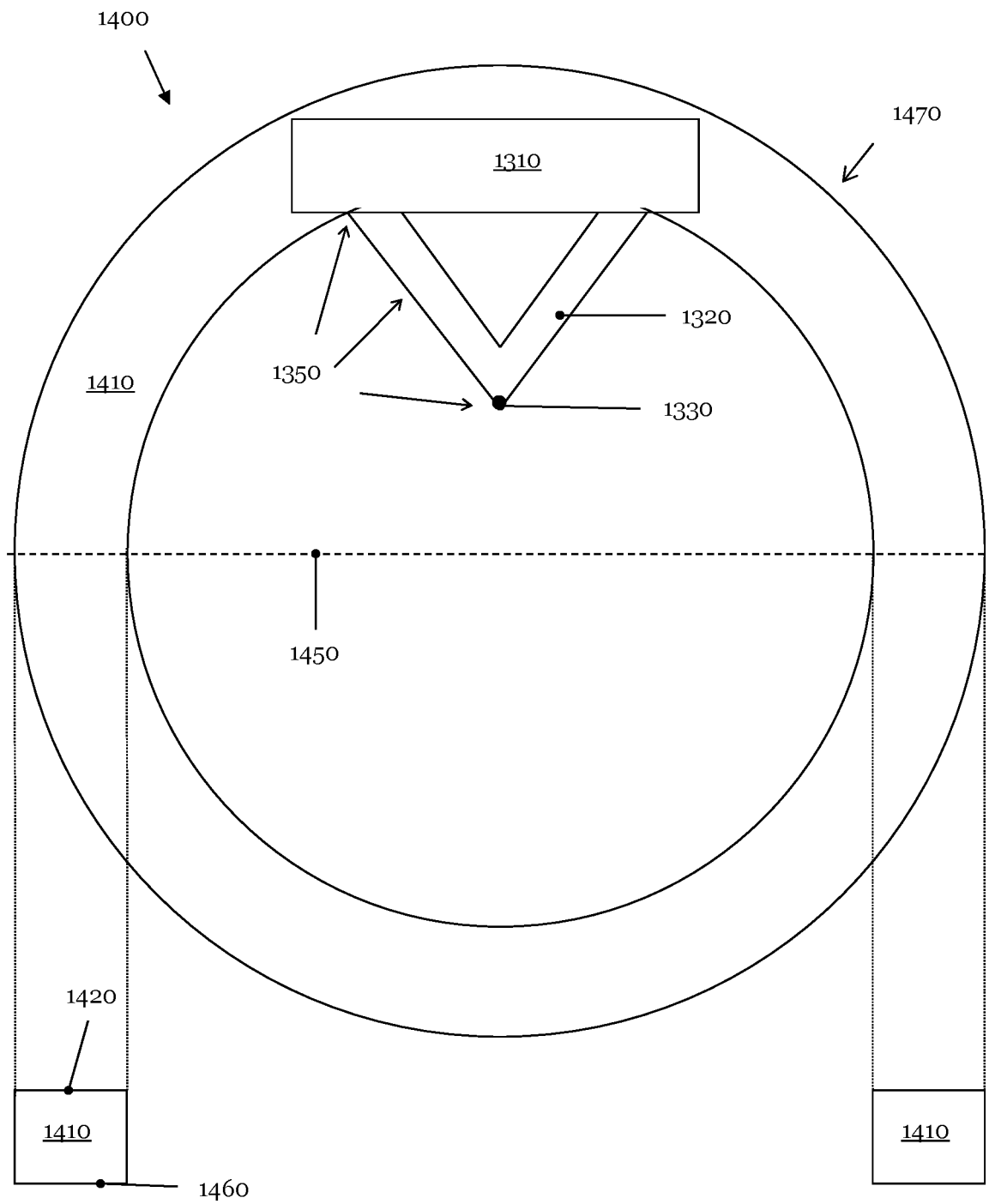
FIG. 14 shows a schematic illustration of a probe with an attached measuring probe.

The diagram 1300 of FIG. 13 presents sections in an xy-plane and in a yz-plane of a measuring probe 1350. The measuring probe 1350 comprises a tip 1330, by means of which a specimen or its surface is examined. The tip 1330 is fastened to a bar which is referred to as a cantilever 1320 below, as is conventional in the art. The cantilever 1320 has a V-shaped embodiment in the example illustrated in FIG. 13. However, the cantilever 1320 also can be embodied in the form of a single bar (not shown in FIG. 13). The cantilever 1320 and the substrate 1310 of the measuring probe 1350 typically have an integral embodiment. The cantilever 1320 and the tip 1330 likewise can be formed from one piece of material, for example a semiconductor, such as e.g. silicon, or a compound semiconductor, such as e.g. silicon nitride. In another exemplary embodiment, a tip 1330 can be made of a different material, for example a nanotube made of carbon, and can be fastened to the cantilever 1320 (not illustrated in FIG. 13). Additionally, the measuring probe 1350 can be folded from a rest position, in which the cantilever 1320 is held substantially horizontally, as indicated in FIG. 14, into a direction against the z-direction such that the height distance between the cantilever 1320, or the substrate 1310, and the tip 1330 is increased or the tip only even has the smallest height, i.e. the smallest value of the measuring probe 1350 in the z-direction. The cantilever 1320 can be made to vibrate during the operation of the measuring probe 1350. The deflection of the cantilever 1320 can be measured, for example using a laser system and a four-quadrant photodiode, and it forms a measurement signal of the measuring probe 1350 in this method of operation (not illustrated in FIG. 13). The tip 1330 of the measuring probe 1350 can scan over a specimen in order to determine a one-dimensional or two-dimensional contour of a specimen surface.

The diagram 1400 of FIG. 14 shows integration of the measuring probe 1350 into a probe 1470. As main constituent parts, the probe 1470 has the measuring probe 1350 and a ring 1410 with a rectangular cross section. The upper part of FIG. 14 represents a view of the probe 1470 from below and the lower part of FIG. 14 shows a section through the ring 1410 along the line 1450. In the example of FIG. 14, the ring 1410 comprises a substantially soft ferromagnetic material. Permalloy (an alloy of nickel and iron) is an example of a soft ferromagnetic material. The upper side of the ring 1420 of the probe 1470 is the fastening area 1420 of the probe 1470 to the receptacle apparatus 110 and a receptacle 155, 255, 655, 755, 855, 955 of the probe storage 120.

The measuring probe 1350 is fastened into a recess, not illustrated in FIG. 14, of the ring 1410 of the probe 1470. By way of example, this can be effectuated by screwing, adhesive bonding, pressing or soldering. As a result of the recess in the ring 1410, it is possible to ensure that, in the rest position of the measuring probe 1350, the tip 1330 thereof does not form the lowest point of the probe 1470 when the probe 1470 is placed onto its lower side 1460. On the other hand, if the measuring probe 1350 is attached to the ring 1410 without a recess, the working distance of the probe 1470, i.e. the height difference between the tip 1330 and the lower side 1460 of the ring 1410, is at a maximum. However, the cost of this arrangement is that the handling in this embodiment of the probe must be carried out with utmost care.

In the example illustrated in FIG. 14, the tip 1330 of the measuring probe 1350 points into the interior of the ring 1410. An advantage of this embodiment is that the measuring probe 1350 is protected when the probe 1470 is transported. Moreover, the inner material-free region of the probe 1470 can be used to install a measurement system for detecting the deflection of the cantilever 1320 during the operation of the probe 1470 if the inner region of the measuring head 1120 of a scanning probe microscope is likewise free from material. However, the measuring probe 1350 can also be fastened to the ring 1410 in such a way that its tip 1330 points to the outside. This requires greater care when removing the probe 1470 from, and depositing the probe 1470 into, the probe storage 120. Further, it is possible to attach two or more measuring probes 1350 to the ring 1410 of the probe 1470, said measuring probes being able to be operated individually or in combination.

In the exemplary probe 1470 of FIG. 14, the soft magnetic material, and hence the fastening area 1420, has a ring shape 1410. However, the fastening area 1420 can have any design for as long as the probe 1470 can form a second releasable magnetic connection 565 with a receptacle apparatus 110 and a first releasable connection 215, 415 or 815 with a receptacle of the probe storage 120. Additionally, the above-discussed geometric restrictions in respect of the receptacles 155, 255, 655, 755, 855, 955 of the probe storage 120 apply.

Figure 15:
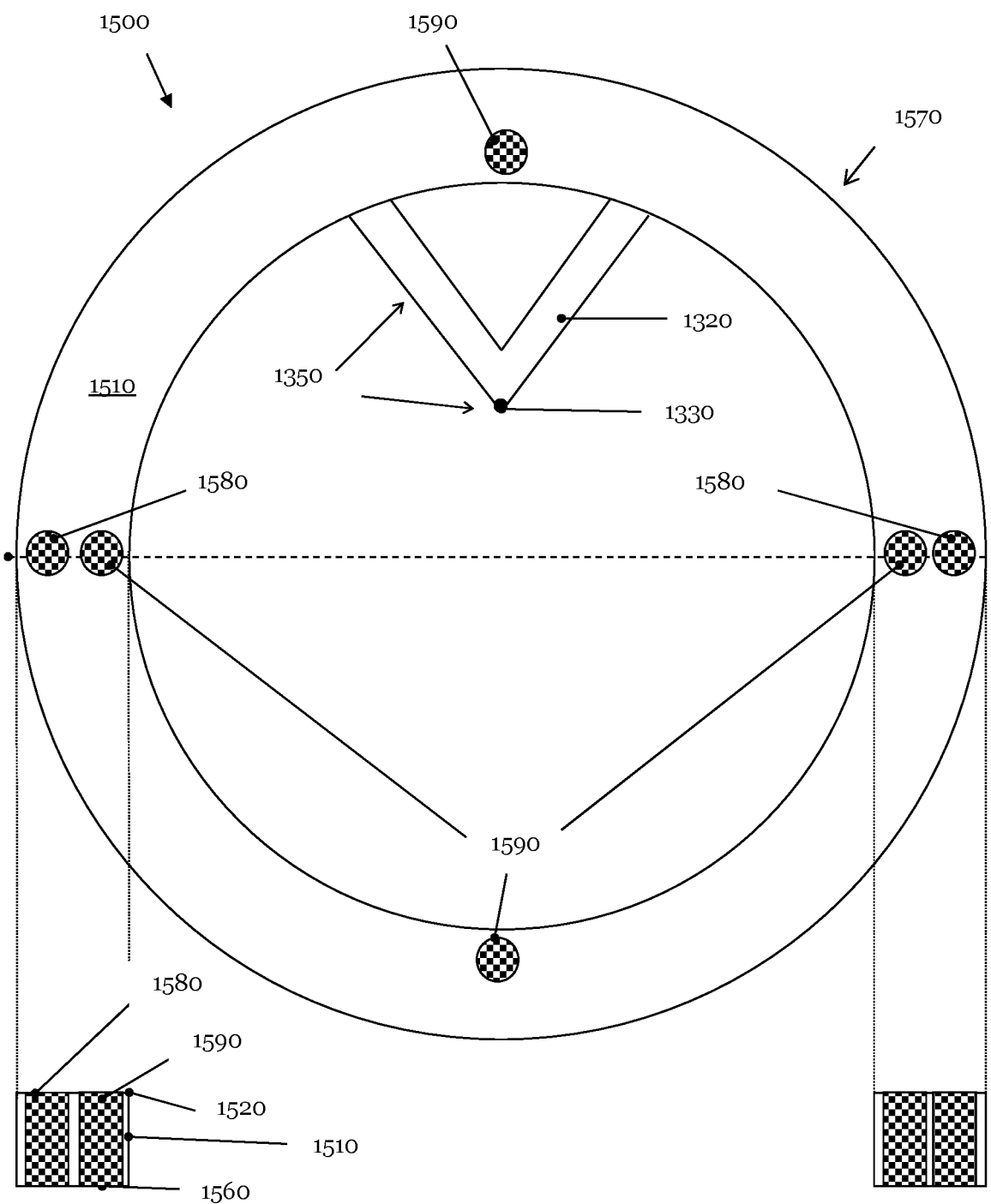
FIG. 15 shows a schematic plan view of a probe.

The diagram 1500 of FIG. 15 shows the plan view of a probe 1570 which represents an expedient embodiment of the soft ferromagnetic material. Unlike in FIG. 14, soft ferromagnetic material does not form the entire ring 1510. The ring 1510 has substantially no ferromagnetic material. Rather, inserts 1590 made of soft ferromagnetic material have been let into the ring 1510, said inserts corresponding to the positions of the permanent magnets 1045 of the receptacle 110 in FIG. 10. The spatial orientation of the inserts made of soft ferromagnetic material 1580 corresponds to the positions of the permanent magnets 145 and 150 of the angled holders 135, 140 of FIG. 1. Concentrating the soft ferromagnetic material to the inserts 1580 and 1590 promotes the alignment of the probe 1570 in relation to the receptacle apparatus 110 of FIG. 10 and the receptacle 155 of the probe storage 120 of FIG. 1 (self-alignment). The effect of the self-alignment can be further improved by virtue of the inserts 1580 and 1590 being rotated against one another (not illustrated in FIG. 15, cf. FIGS. 21 and 22).

In the previously described exemplary embodiments, the receptacle apparatus 110 has at least one permanent magnet 1045, the probe 170, 1470, 1570 has a soft ferromagnetic material, and the receptacle of the probe storage 120 can have one or more permanent magnets. A sensor system 100 can also be embodied in such a way that a probe has at least one permanent magnet, the receptacle apparatus comprises a soft ferromagnetic material, and a receptacle of the probe storage likewise can comprise a soft ferromagnetic material.

Figure 16:
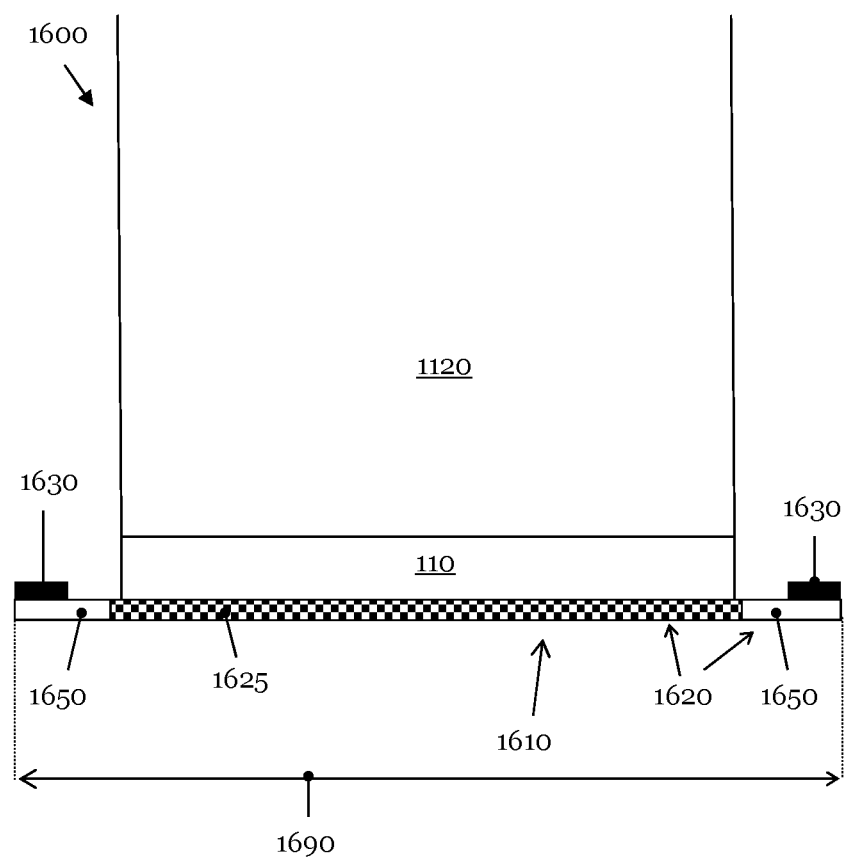
FIG. 16 elucidates a schematic illustration of an arrangement for determining a magnetic flux density distribution of a probe storage.

The configuration 1600 of FIG. 16 elucidates, in an exemplary manner, a system with which the magnetic flux density distribution produced by the holders 155, 255, 655, and 755 can be measured three-dimensionally. Similar to FIG. 10, the receptacle apparatus 110 is fastened to a measuring head 1120 of an SPM. At its free end, the receptacle apparatus 110 carries a measurement apparatus 1610 for measuring a magnetic flux density distribution. The measurement apparatus 1610 comprises a disk 1620. The inner region 1625 of the disk 1620, which extends at least as far as the edge of the receptacle apparatus 110, has soft ferromagnetic material which substantially shields the magnetic flux density distribution produced by the permanent magnet 1045 of the receptacle apparatus 110. Respectively one magnetic field sensor 1630, for example in the form of a Hall probe, is attached to the measurement apparatus 1610 at the outer non-ferromagnetic ends 1650 of the disk 1620, which extend beyond the receptacle apparatus 110. It is expedient if the thickness of the disk 1620 is no thicker than the probe 170, 1470, 1570 so that the measurement apparatus 1610 can be guided through between the holders 155.

The measurement apparatus 1610 can be guided or scanned over the probe storage 120 at various heights. Using this, it is possible to generate a three-dimensional distribution of the magnetic flux density of the probe storage 120. If the lateral dimension 1690 of the disk 1620 of the measurement apparatus 1610—as illustrated in FIG. 16—is no greater than that of the probe 170, 1470, 1570, the magnetic flux density of the permanent magnets 145, 150, 245, and 247 can be determined in the region in which these form the first magnetic connection 215, 415 with a probe 170, 1470, 1570. The measured magnetic flux density distribution can be used for aligning a probe 170, 1470, 1570 for deposition in the probe storage 120. For the purposes of sampling the magnetic flux density distribution, the measurement apparatus 1620 can be guided over the probe storage 120 by use of the movement options of the measuring head 1120 or the specimen stage 190 can guide the probe storage 120 under the measurement apparatus 1610. Further, a combined movement of the specimen stage 190, for example in the xy-plane, and of the measurement apparatus 1610, for example in the z-direction, is possible.

Figure 17:
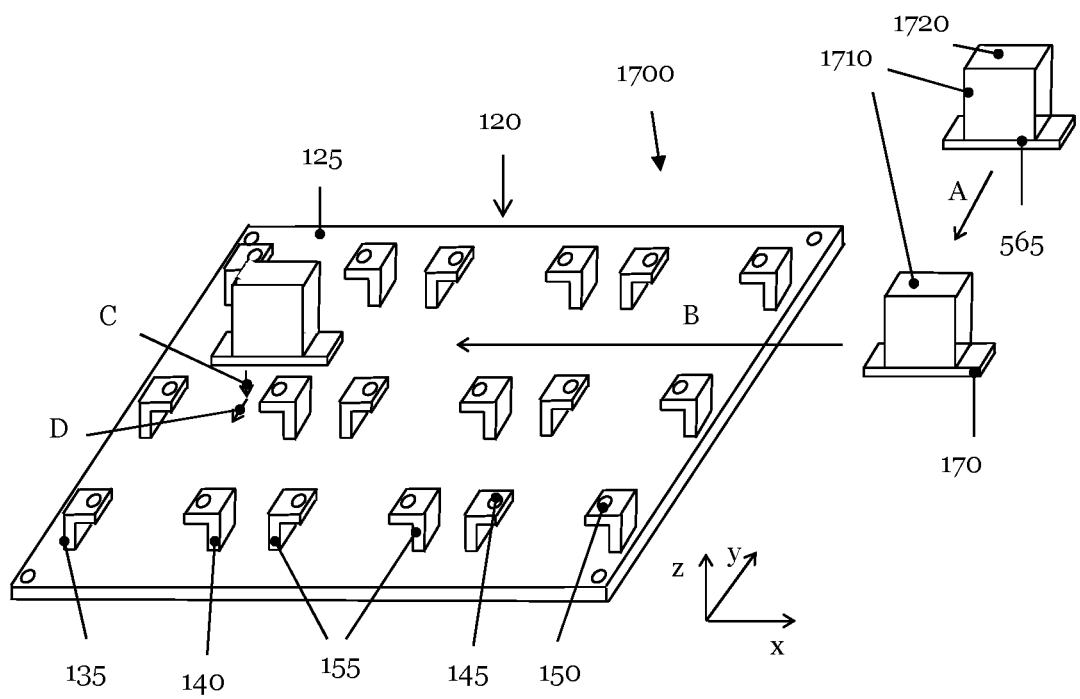
FIG. 17 shows a schematic illustration of transporting a probe into the vicinity of a receptacle of a probe storage.

The following figures elucidate, in an exemplary manner, the process of depositing a probe 170, 1470, 1570 in a receptacle 155 of the probe storage 120. The diagram 1700 in FIG. 17 shows the probe storage 120 of FIG. 1 and a probe 170, 1470, 1570 which should be deposited in one of the receptacles 155 of the probe storage 120. The combination 1710 symbolizes a measuring head 1120 of an SPM, or the lower end thereof, on which a receptacle apparatus 110 has been attached. The probe 170, 1470, 1570 has a magnetic connection (the second magnetic connection 565) with the receptacle apparatus 110 of the combination 1710, as a result of which the probe 170, 1470, 1570 is held by the receptacle apparatus 110 of the combination 1710. In the initial position 1720, the probe 170, 1470, 1570 can examine a specimen (not shown in FIG. 17). In a first step, the measuring head 1120 of the combination 1710 moves in the z-direction such that a distance arises between the probe 170, 1470, 1570 and the surface of a specimen to be examined (not shown in FIG. 17).

In step A, the probe 170, 1470, 1570 is moved in the y-direction along the probe storage 120, either by displacing the specimen stage in the y-direction or by moving the measuring head 1120 of the combination 1710 in the direction of the negative y-axis. In step B, the probe 170, 1470, 1570 is displaced in the x-direction until the probe 170, 1470, 1570 is aligned with one of the receptacles 155 of the probe storage 120 in respect of this direction. In step C, the probe 170, 1470, 1570 is lowered such that the probe 170 does not contact the base plate 125 of the probe storage 120 but at the same time fits under the angled parts 260, 265 of the angled holders 135, 140. In step D, the probe 170, 1470, 1570 is aligned in respect of the receptacle 155 in which the probe 170, 1470, 1570 should be deposited by virtue of a displacement in the y-direction. In the example of FIG. 17, this is the middle receptacle 155 in the left row of the probe storage 120.

Figure 18:
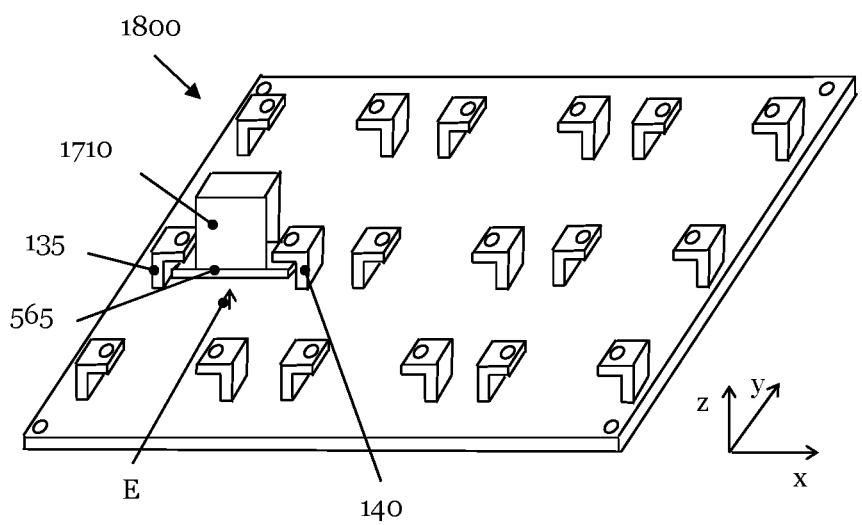
FIG. 18 illustrates a schematic illustration of transporting a probe into a receptacle of a probe storage.
Figure 19:
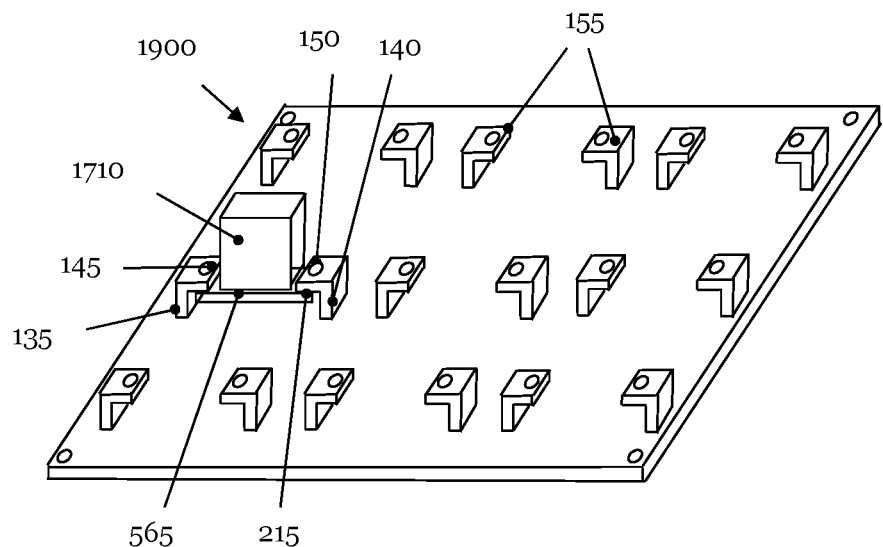
FIG. 19 indicates the formation of the first magnetic connection between a probe and a receptacle of a probe storage.

The diagram 1800 of FIG. 18 elucidates the position of the probe 170, 1470, 1570 in respect of the angled holders 135, 140 after carrying out step D. Step E is carried out next, in which the probe 170, 1470, 1570 is raised so much that the probe 170, 1470, 1570 forms a first magnetic connection 215, 415 with the permanent magnets 145, 150 of the angled parts 260, 265 of the angled holders 135, 140. (Alternatively, the probe can form a first mechanical connection 815 with a receptacle 855, 955 (cf. FIGS. 8 and 9)). The position of the probe 170, 1470, 1570 after carrying out step E is illustrated in the diagram 1900 of FIG. 19. The presence of the first magnetic connection 215, 415 can be detected using the electrical measurement system 380 described in FIG. 3. During the process of forming the first magnetic connection 215, 415 or the mechanical connection 815 between the probe 170, 1470, 1570 and the permanent magnets 145, 150 or the receptacle 855, 955, the probe 170 is guided by the second magnetic connection 565 in a defined manner such that the probe 170, 1470, 1570 cannot carry out any uncontrolled movements while forming the first magnetic connection 215, 415 or the mechanical connection 815.

Figure 20:
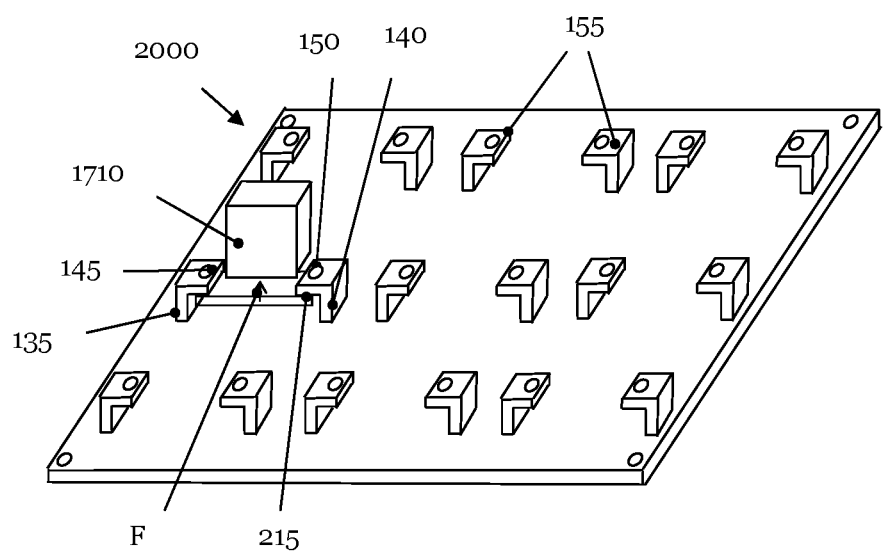
FIG. 20 shows the release of the second magnetic connection between a probe and a receptacle apparatus.

Finally, the second magnetic connection 565 between the probe 170 and the receptacle apparatus 110 of the combination 1710 is released by further lifting of the combination 1710 in the z-direction (step F). The diagram 2000 of FIG. 20 shows the probes 170, 1470, 1570 deposited in the receptacle 155 in the probe storage 120 after carrying out step F. (In the exemplary embodiments illustrated in FIGS. 8 and 9, the magnetic connection 565 is released by displacing the receptacle apparatus 110 in the downward direction, i.e. in the negative z-direction). During the release of the second magnetic connection 565, the first magnetic connection 215, 415 or the mechanical connection 815 keeps the probe 170, 1470, 1570 in its position and thereby prevents an uncontrolled movement of the probe 170, 1470, 1570 during the release process.

If the series connection by way of a combination of an electrical coil 550 and a permanent magnet 545 illustrated in FIG. 3 is installed into the receptacle apparatus 110 instead of the permanent magnets 1045, the release process of the second magnetic connection 565 can be assisted by a defined reduction in the magnetic force acting on the receptacle apparatus 110. Consequently, particles are not produced when depositing the probe 170, 1470, 1570 in the receptacle 155 of the probe storage 120.

Receiving a probe 170, 1470, 1570 from a receptacle 155 of the probe storage 120 is effectuated by virtue of the sequence of steps A to F being run through in the reverse sequence (not illustrated in FIGS. 17 to 20).

The relative movements between the probe 170, 1470, 1570 and the receptacle 155 of the probe storage 120 (steps A to E) or between the probe 170, 1470, 1570 and the receptacle apparatus 110 of the combination 1710 (step G) can be effectuated by displacing the specimen stage 190 on which the probe storage 120 is arranged. It is also possible that these relative movements are only carried out by the measuring head 1120 of the combination 1710. It is currently preferred if the specimen stage 190 carries out the aforementioned movements in the xy-plane by displacing the probe storage 120 and the measuring head 1120 of an SPM carries out the relative movements of the receptacle apparatus 110 in the z-direction.

Carrying out the movements of the steps A to F can be monitored by a camera. Additionally, use can be made of markings on the angled holders 135, 140 and/or on the base plate 125 of the probe storage 120 for aligning the receptacle apparatus 110 of the combination 1710 in relation to the probe 170, 1470, 1570 or for aligning the probe 170, 1470, 1570 in relation to the receptacle 155 of the probe storage 120 (not illustrated in FIGS. 17 to 20). Additionally, or alternatively, use can be made of a four-quadrant photodiode in combination with a vertical laser beam in order to align the three components of receptacle 155 of the probe storage 120, probe 170, 1470, 1570, and receptacle apparatus 110 in relation to one another. Moreover, to this end, use can be made of further optical systems for determining a position, e.g. photodiode-based systems, or of electrical systems, such as e.g. capacitive position detectors. Additionally, or alternatively, mechanical and/or optical sensors can be used for positioning the probe 170 in the z-direction. In order to determine whether a receptacle has a probe 170, 1470, 1570 or whether it is empty, use can be made of a camera or the electrical measurement system 380.

Figure 21:
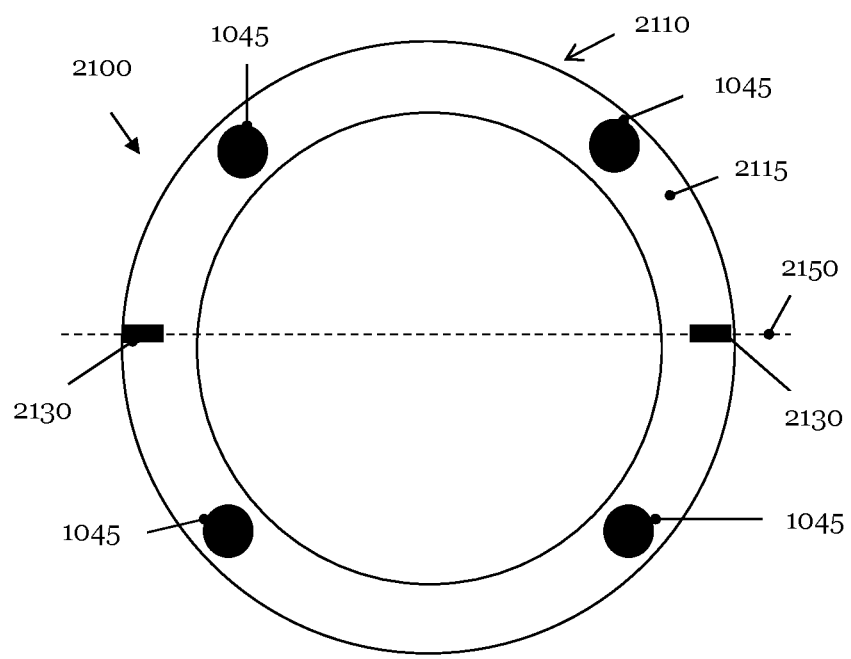
FIG. 21 schematically elucidates a second embodiment of a receptacle apparatus having two magnetic field sensors.

A substantial advantage of the sensor system 100 described in this application is that the magnetic flux density distributions produced by the receptacle apparatus 110 and by the receptacle 155, 255, 655, 755 of the probe storage 120 can be used for aligning the receptacle apparatus 110 relative to the probe 170, 1470, 1570 and for aligning the probe 170, 1470, 1570 in relation to a receptacle 155, 255, 655, 755. The measurement of the three-dimensional flux density distribution generated by the receptacle 155, 255, 655, 755 was already explained in the context of FIG. 16. The diagram 2100 of FIG. 21 shows an exemplary receptacle apparatus 2110 from below, having four permanent magnets 1045 which are rotated by 45° in relation to the example of FIG. 15. Two magnetic field sensors 2130, for example in the form of a Hall sensor, are attached along the sectional line 2150 at the outer ends of the ring 2115. It is expedient to let the magnetic field sensors 2130 into the ring 2115 so that the rest of a probe 170, 1470, 1570 in the ring 2115 of the receptacle apparatus 2110 is not impeded.

For the purposes of receiving a probe 170, 1470, 1570 from the receptacle 155 of the probe storage 120, the receptacle apparatus 2110 approaches the angled holders 135, 140 from above. The magnetic field sensors 2130 of the receptacle apparatus 2110 detect the magnetic flux density distribution generated by the permanent magnets 145, 150 in the angled holders 135, 140. A change in the inhomogeneous flux density distribution of the permanent magnets 145, 150, detected by the sensors 1630, can be used to align the receptacle apparatus 2110 in respect of the probe 170, 1470, 1570 deposited in the receptacle 155. In one embodiment, this is carried out by virtue of the flux density determined by the sensors 2130 is compared to the flux density at the respective locations measured by use of the magnetic field sensors 1630.

Figure 22:
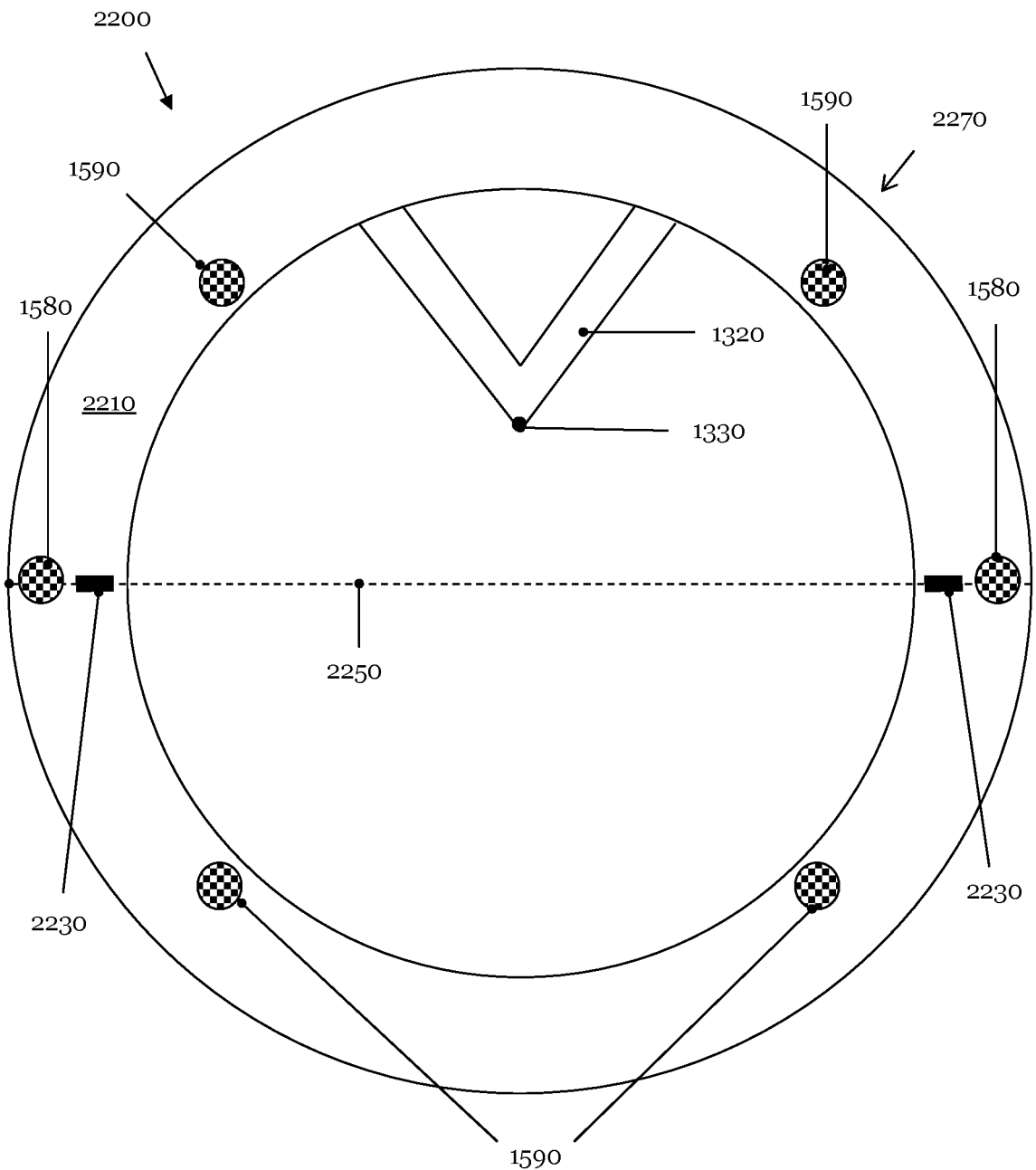
FIG. 22 schematically shows an embodiment of a probe having two magnetic field sensors.

The diagram 2200 of FIG. 22 elucidates a probe 2270 that fits to the receptacle apparatus 2110, said probe having two magnetic field sensors 2230 along the line 2250. The details in respect of this probe 2270 were explained within the scope of the discussion of FIG. 15. Once again, the magnetic field sensors 2230 can be embodied as Hall sensors. It is advantageous to let the two sensors 2230 into a recess of the ring 2210 (not shown in FIG. 22) in order to prevent an impairment of the seat of the probe 2270 on the receptacle apparatus 2110.

When depositing the probe 2270 in a receptacle 155 of the probe storage 120, the magnetic field sensors 2230 can determine an approach of the probe 2270 to the permanent magnets 145, 150 of the angled holders 135, 140. Here, the sensors 2230 can detect a movement of the probe 2270 both in the y-direction and in the z-direction. The measurement signal generated by the magnetic field sensors 2230 can be used to determine the alignment of the probe 2270 in respect of a receptacle 155, either on its own or in combination with one or more of the above-described measurement systems.

Figure 23:
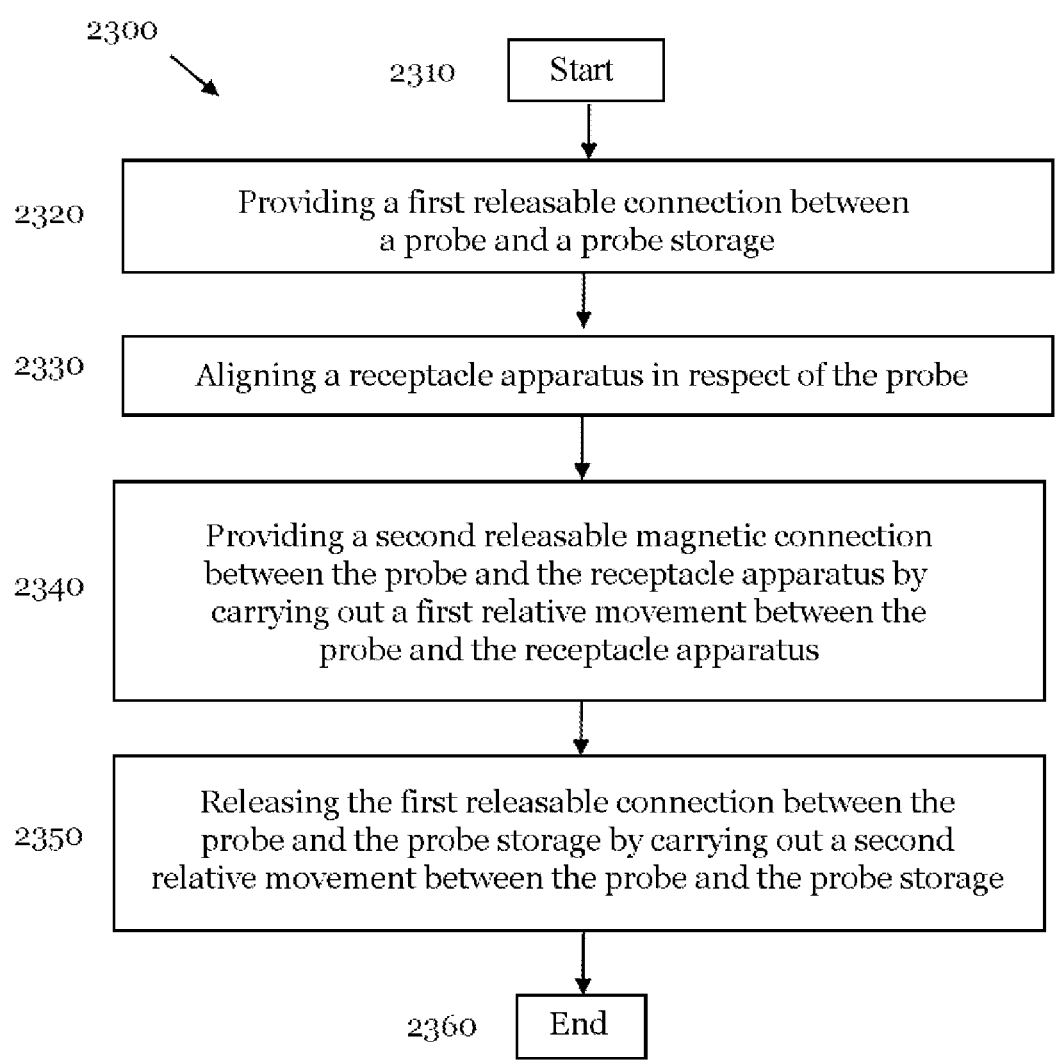
FIG. 23 describes a flowchart which reproduces the steps of receiving a probe from a probe storage.

Finally, FIG. 23 reproduces a flowchart 2300 of an embodiment of a method for receiving a probe from a probe storage. The method begins at 2310. In the first step 2320, a probe forms a first releasable connection with a receptacle of a probe storage. The first releasable connection can be formed in the form of a first magnetic connection 215, 415 between a probe 170, 1470, 1570, 2270 and angled holders 135, 140, or it can be formed by a probe 870 in the form of a mechanical connection 815. In step 2330, the receptacle apparatus 110, 2110 is aligned with respect to the probe 170, 870, 1470, 1570, 2270. In step 2340, a second magnetic connection 565 is formed between the probe 170, 870, 1470, 1570, 2270 and the receptacle apparatus 110, 2110 by carrying out a relative movement between the probe 170, 870, 1470, 1570, 2270 and the receptacle apparatus 110, 2340. In the last step 2350, the first magnetic connection 215, 415 or the mechanical connection 815 is released by a relative movement between the probe 170, 870, 1470, 1570, 2270 and the receptacle 155 of the probe storage 120. The method ends at step 2360.

What is claimed is:

1. A probe system for a scanning probe microscope, having:
   a. a receptacle apparatus for a probe;
   b. a probe storage, which provides at least one probe for the scanning probe microscope;
   c. wherein the probe, the probe storage, and the receptacle apparatus are embodied in such a way that the probe can form a releasable first connection with the probe storage and a releasable second connection with the receptacle apparatus, wherein the first connection and/or the second connection use a magnetic force;
   d. wherein the probe storage and/or the receptacle apparatus and/or the probe have at least one permanent magnet that has a maximum magnetic flux density in the range of 0.01 tesla-2.0 tesla; and
   e. wherein the receptacle apparatus and the probe storage are movable relative to one another in such a way for receiving the probe that the probe forms the second connection before the first connection is released.

2. The probe system as claimed in claim 1, wherein the receptacle apparatus and the probe storage are movable relative to one another in such a way for depositing the probe that the probe forms the first connection before the second connection is released.

3. The probe system as claimed in claim 1, wherein the probe storage and/or the receptacle apparatus and/or the probe have at least one soft ferromagnetic material.

4. The probe system as claimed in claim 1, further having at least one electrical coil which is arranged in such a way that it can influence the releasable first connection and/or the releasable second connection.

5. The probe system as claimed in claim 1, wherein the at least one permanent magnet has a maximum magnetic flux density in the range of 0.05 tesla-1.0 tesla.

6. The probe system as claimed in claim 1, further having at least one magnetic field sensor for determining a position of the receptacle apparatus relative to the probe and/or the probe storage.

7. The probe system as claimed in claim 1, further having a first electrical measurement system which is embodied to determine whether the probe has formed the first connection to the probe storage.

8. The probe system as claimed in claim 1, further having a second electrical measurement system which is embodied to determine whether the probe has formed the second connection to the receptacle apparatus.

9. The probe system as claimed in claim 1, wherein the probe has at least two sides and wherein the probe is embodied to establish the first connection and the second connection to the probe storage and the receptacle apparatus, respectively, by way of the same side of the probe.

10. The probe system as claimed in claim 1, wherein the receptacle apparatus is attached to a measuring head of the scanning probe microscope.

11. The probe system as claimed in claim 1, wherein the probe comprises: at least one measuring tip, at least one cantilever, and at least one fastening area for the first connection and/or the second connection.

12. The probe system as claimed in claim 1, wherein the probe storage comprises at least one angled holder for the probe, wherein at least one portion of the angled holder is embodied to form the first connection.

13. The probe system as claimed in claim 12, wherein the probe storage comprises at least two angled holders for forming the first connection to the probe.

14. The probe system as claimed in claim 13, wherein the distance between the two angled holders is less than a dimension of a fastening area of the probe.

15. The probe system as claimed in claim 13, wherein the distance between the two angled holders is greater than a dimension of a fastening area of the receptacle apparatus such that the receptacle apparatus can be moved between the two angled holders.

16. The probe system as claimed in claim 13, wherein the at least two angled holders are arranged in such a way that the probe can be moved by the receptacle apparatus in a direction away from the two angled holders.

17. The probe system as claimed in claim 1, further having a specimen stage on which the probe storage is arranged, wherein the specimen stage comprises at least one displacement unit which is embodied to displace the specimen stage in at least a specimen stage plane.

18. The probe system of claim 1 in which the at least one permanent magnet has a maximum magnetic flux density in the range of 0.1 tesla to 0.5 tesla.

19. The probe system of claim 1 in which the at least one permanent magnet has a maximum magnetic flux density in the range of 0.2 tesla to 0.4 tesla.

20. A method for receiving a probe of a scanning probe microscope by use of a probe system, wherein the method includes the following steps:
   a. providing a first releasable connection between a probe and a probe storage;
   b. providing a second releasable connection between the probe and a receptacle apparatus; and
   c. releasing the first connection together with a movement of the receptacle apparatus relative to the probe storage, wherein the first connection and/or the second connection comprises a magnetic force;
   d. wherein the probe storage and/or the receptacle apparatus and/or the probe have at least one permanent magnet that has a maximum magnetic flux density in the range of 0.01 tesla-2.0 tesla.

21. The method as claimed in claim 20, wherein the method is carried out using a probe system for a scanning probe microscope, the probe system having:
   a. a receptacle apparatus for a probe;
   b. a probe storage, which provides at least one probe for the scanning probe microscope;
   c. wherein the probe, the probe storage, and the receptacle apparatus are embodied in such a way that the probe can form a releasable first connection with the probe storage and a releasable second connection with the receptacle apparatus, wherein the first connection and/or the second connection use a magnetic force; and
   d. wherein the receptacle apparatus and the probe storage are movable relative to one another in such a way for receiving the probe that the probe forms the second connection before the first connection is released.

22. A probe system for a scanning probe microscope, having:
   a. a receptacle apparatus for a probe;
   b. a probe storage, which provides at least one probe for the scanning probe microscope;
   c. wherein the probe, the probe storage, and the receptacle apparatus are embodied in such a way that the probe can form a releasable first connection with the probe storage and a releasable second connection with the receptacle apparatus, wherein the first connection and/or the second connection use a magnetic force;
   d. wherein the receptacle apparatus and the probe storage are movable relative to one another in such a way for receiving the probe that the probe forms the second connection before the first connection is released; and
   e. wherein the probe has at least two sides and wherein the probe is embodied to establish the first connection and the second connection to the probe storage and the receptacle apparatus, respectively, by way of the same side of the probe.

23. A probe system for a scanning probe microscope, having:
   a. a receptacle apparatus for a probe;
   b. a probe storage, which provides at least one probe for the scanning probe microscope;
   c. wherein the probe, the probe storage, and the receptacle apparatus are embodied in such a way that the probe can form a releasable first connection with the probe storage and a releasable second connection with the receptacle apparatus, wherein the first connection and/or the second connection use a magnetic force;
   d. wherein the receptacle apparatus and the probe storage are movable relative to one another in such a way for receiving the probe that the probe forms the second connection before the first connection is released;
   e. wherein the probe storage comprises at least one angled holder for the probe, wherein at least one portion of the angled holder is embodied to form the first connection;
   wherein the probe storage comprises at least two angled holders for forming the first connection to the probe; and
   wherein the distance between the two angled holders is less than a dimension of a fastening area of the probe.

24. A method for receiving a probe of a scanning probe microscope by use of a probe system, wherein the method includes the following steps:
   a. providing a first releasable connection between a probe and a probe storage;
   b. providing a second releasable connection between the probe and a receptacle apparatus; and
   c. releasing the first connection together with a movement of the receptacle apparatus relative to the probe storage, wherein the first connection and/or the second connection comprises a magnetic force;
   d. wherein the probe has at least two sides, and providing the first releasable connection between the probe and the probe storage comprises providing the first releasable connection between a first side of the probe and the probe storage; and
   e. wherein providing the second releasable connection between the probe and the receptacle apparatus comprises providing the second releasable connection between the first side of the probe and the receptacle apparatus.

\* \* \* \* \*